(12) United States Patent
Mizrahi

(10) Patent No.: US 9,112,630 B1
(45) Date of Patent: *Aug. 18, 2015

(54) CLOCK SYNCHRONIZATION IN THE PRESENCE OF SECURITY THREATS

(71) Applicant: Marvell Israel (M.I.S.L) Ltd., Yokneam (IL)

(72) Inventor: Tal Mizrahi, Haifa (IL)

(73) Assignee: Marvell Israel (M.I.S.L) Ltd., Yokneam (IL)

( * ) Notice: Subject to any disclaimer, the term of this patent is extended or adjusted under 35 U.S.C. 154(b) by 82 days.

This patent is subject to a terminal disclaimer.

(21) Appl. No.: 13/890,945

(22) Filed: May 9, 2013

Related U.S. Application Data

(63) Continuation-in-part of application No. 13/764,732, filed on Feb. 11, 2013.

(60) Provisional application No. 61/644,722, filed on May 9, 2012, provisional application No. 61/644,738, filed (Continued)

(51) Int. Cl.
*H04J 3/06* (2006.01)
*H04B 7/212* (2006.01)

(52) U.S. Cl.
CPC .................................. *H04J 3/0679* (2013.01)

(58) Field of Classification Search
USPC ................. 370/392–400, 463–503, 252–354; 709/241–249
See application file for complete search history.

(56) References Cited

U.S. PATENT DOCUMENTS

| | | | |
|---|---|---|---|
| 6,360,271 B1 * | 3/2002 | Schuster et al. | 709/231 |
| 7,277,954 B1 | 10/2007 | Stewart et al. | |
| 7,876,791 B2 * | 1/2011 | Jung et al. | 370/503 |
| 7,990,909 B2 * | 8/2011 | Brueckheimer | 370/324 |

(Continued)

FOREIGN PATENT DOCUMENTS

| | | | |
|---|---|---|---|
| DE | 10 2008026391 A1 | 12/2009 | |
| EP | 2254267 A1 | 11/2010 | |

(Continued)

OTHER PUBLICATIONS

IEEE P802.1AS/D0.8, "Draft Standard for Local and Metropolitan Area Networks—Timing and Synchronization for Time-Sensitive Applications in Bridged Local Area Networks," *The Institute of Electrical and Electronics Engineers, Inc.*, pp. 1-149 (May 25, 2007).

(Continued)

*Primary Examiner* — Man Phan

(57) ABSTRACT

In a network device communicatively coupled to a master clock via a plurality of different communication paths, a clock synchronization module is configured to determine a plurality of path time data sets corresponding to the plurality of different communication paths based on signals received from the master clock via the plurality of different communication paths between the network device and the master clock. A clock module is configured to determine that at least one of the plurality of path time data sets is inaccurate based on accuracy metrics corresponding to the plurality of path time data sets, and determine a time of day as a function of a remainder of one or more path time data sets, in the plurality of path time data sets, not determined to be inaccurate. The device may detect and/or mitigate "man-in-the-middle" attacks aimed at a clock synchronization protocol.

20 Claims, 11 Drawing Sheets

Related U.S. Application Data on May 9, 2012, provisional application No. 61/647,087, filed on May 15, 2012, provisional application No. 61/647,123, filed on May 15, 2012, provisional application No. 61/695,367, filed on Aug. 31, 2012, provisional application No. 61/695,371, filed on Aug. 31, 2012, provisional application No. 61/706,526, filed on Sep. 27, 2012, provisional application No. 61/597,092, filed on Feb. 9, 2012.

(56) References Cited

U.S. PATENT DOCUMENTS

| | | | |
|---|---|---|---|
| 8,483,244 B2 * | 7/2013 | Rahbar | 370/519 |
| 8,644,348 B2 * | 2/2014 | Zampetti | 370/503 |
| 8,675,502 B2 | 3/2014 | Blair | |
| 8,730,868 B2 * | 5/2014 | Yamada et al. | 370/324 |
| 8,769,046 B2 | 7/2014 | Knapp et al. | |
| 8,774,227 B2 * | 7/2014 | Rahbar | 370/503 |
| 2005/0152330 A1 | 7/2005 | Stephens et al. | |
| 2009/0147806 A1 | 6/2009 | Brueckheimer | |
| 2010/0020909 A1 | 1/2010 | Jung et al. | |
| 2010/0296406 A1 | 11/2010 | Rahbar | |
| 2010/0296524 A1 | 11/2010 | Rahbar | |
| 2012/0269204 A1 | 10/2012 | Zampetti | |
| 2013/0223458 A1 * | 8/2013 | Bui | 370/503 |
| 2013/0259049 A1 | 10/2013 | Mizrahi | |
| 2014/0161143 A1 | 6/2014 | Mizrahi et al. | |

FOREIGN PATENT DOCUMENTS

| | | | |
|---|---|---|---|
| WO | WO-2012-065823 A1 | 5/2012 | |
| WO | WO-2012065823 A1 | 5/2012 | |
| WO | WO-2013/167977 A1 | 11/2013 | |

OTHER PUBLICATIONS

Abstract of IEEE 802.1AS Standard, "802.1AS—Timing and Synchronization," *The Institute of Electrical and Electronics Engineers, Inc.*, available at <http://www.ieee802.org/1/pages/802.1as.html>, 1 page (Nov. 11, 2010).
IEEE Std 802.11e/D11.0, "IEEE Standard for Information technology—Telecommunications and information exchange between systems—Local and metropolitan area networks—Specific requirements, Part 11: Wireless Medium Access Control (MAC) and Physical Layer (PHY) Specifications: Amendment 7: Medium Access Control (MAC) Quality of Service (QoS) Enhancements," *The Institute of Electrical and Electronics Engineers, Inc.*, pp. 1-179 (Oct. 2004).
Mills, D. "Internet Time Synchronization: The Network Time Protocol," Network Working Group Request for Comments, No. 1129, pp. 1-29 (Oct. 1989).
Tournier, et al., "Precise Time Synchronization on a High Available Redundant Ring Protocol," ISPCS 2009 International IEEE Symposium on Precision Clock Synchronization for Measurement, Control and Communication, Brescia, Italy, pp. 1-4 (Oct. 12-16, 2009).
International Search Report and Written Opinion for corresponding International Application No. PCT/IB2013/000633, 18 pages (Oct. 16, 2013).
International Preliminary Report on Patentability for corresponding International Application No. PCT/IB2013/000633 dated Aug. 12, 2014 (12 pages).
Office Action in U.S. Appl. No. 13/764,732, dated Aug. 29, 2014 (19 pages).
IEEE Std. 15888$^{TM}$-2008 (Revision of IEEE Std. 1588-200), "IEEE Standard for a Precision Clock Synchronization Protocol for Networked Measurement and Control Systems," The Institute for Electrical and Electronics Engineers, Inc., IEEE Standard, Jul. 2008.
D. Mills, et al., "Network Time Protocol Version 4: Protocol and Algorithms Specification," Request for Comments: 5905, Internet Engineering Task Force (IETF), Jun. 2010.
R. Zarick, et al., "The Impact of Network Latency on the Synchronization of Real-World IEEE 1588-2008 Devices," Proc. of the 2010 Int'l IEEE Symposium on Precision Clock Synchronization for Measurement, Control and Communication, pp. 135-140, Sep. 27-Oct. 1, 2010.
A. Mukherjee, "On the Dynamics and Significance of Low Frequency Components of Internet D Load," Internetworking: Research and Experience. vol. 5. No. 4. pp. 163-205, 1994.
V. Paxson, "End-to-End Internet Packet Dynamics," IEEE/ACM Transactions on Networking, vol. 7(3), pp. 277-292, 1999.
G. Appenzeller, et al., "Sizing router buffers," SIGCOMM, 2004.
M. Alizadeh, et al., "DCTCP: Efficient packet transport for the commoditized data center," SIGCOMM, 2010.
A. Abdul, et al., "Integration of HSR and IEEE1588 over Ethernet networks," Proc. of the 2010 Int'l IEEE Symposium on Precision Clock Synchronization for Measurement, Control and Communication, pp. 77-82, Sep. 27-Oct. 1, 2010.
O. Gurewitz, et al., "One-Way Delay Estimation Using Network Wide Measurements," IEEE Trans. on Information Theory, vol. 52, No. 6, pp. 2710-2724, 2006.
O. Gurewilz, et al., "Estimating One-Way Delays from Cyclic-Path Delay Measurements," Proc. of Twentieth Annual Joint Conf. of the IEEE Computer and Comm. Societies (IEEE INFOCOM 2001), vol. 2, pp. 1038-1044, 2001.
S. Lee, "An Enhanced IEEE 1588 Time Synchronization Algorithm for Asymmetric Communication Link Using Block Burst Transmission", IEEE Communications Letters, vol. 12, No. 9, pp. 687-689, Sep. 2008.
S. Lv, et al., "An Enhanced IEEE 1588 Time Synchronization for Asymmetric Communication Link in Packet Transport Network," IEEE Communications Letters, vol. 14. No. 8. pp. 764-766, Aug. 2010.
N. Simanic, et al., "Compensation of Asymmetrical Latency for Ethernet Clock Synchronization," Proc. of the 2011 Int'l IEEE Symposium on Precision Clock Synchronization for Measurement, Control and Communication (ISPCS), 2011, pp. 19-24, 2011.
A. Corlett, et al. "Statistics of One Way Internet Packet Delays", Internet Engineering Task Force, Aug. 2002, available at http://tools.ietf.org/id/draft-corlett-statistics-of-packet-delays-00.txt.
J. Zhang, et al., "PDV-based PTP LSP Setup, Reoptimization and Recovery," Internet Engineering Task Force, Oct. 2011.
W. Chin, et al., "IEEE 1588 Clock Synchronization using Dual Slave Clocks in a Slave," IEEE Communications Letters, vol. 13, No. 6, pp. 456-458, 2009.
ITU-T Recommendation G.8265.1/Y.1365.1, "Precision time protocol telecom profile for frequency synchronization," *Intl Telecommunication Union*, Oct. 2010.
IEEE Std. C37.238$^{TM-2011}$, "IEEE Standard Profile for Use of IEEE 1588$^{TM}$ Precision Time Protocol in Power System Applications," *Institute for Electrical and Electronics Engineers, Inc.*, Jul. 2011.
IEC 62439-3, "Industrial communication networks—High availability automation networks—Part 3: Parallel Redundancy Protocol (PRP) and High-availability Seamless Redundancy (HSR)," *International Electrotechnical Commission*, 2010.
K. Weber, et al., "High availability seamless automation ring (Draft IEC 62439-3) and IEEE 1588 time sync dependencies," *Institute for Electrical and Electronics Engineers*, Inc., Oct. 2010.
"Ptpv2d Project Home Information," pp. 1-3, 2010.
"Netem," Linux Foundation, Nov. 2009.
"Paragon-X," Calnex Solutions, 2010.
"Weighted mean," Wikipedia, pp. 1-10, last updated Feb. 2013.
Mizrahi, T., "Slave Diversity: Using Multiple Paths to Improve the Accuracy of Clock Synchronization Protocols," Precision Clock Synchronization for Measurement Control and Communication (ISPCS), 2012 International IEEE Symposium, Sep. 24, 2012.
Mizrahi, T., "A Game Theoretic Analysis of Delay Attacks against Time Synchronization Protocols," Precision Clock Synchronization for Measurement, Control and Communication (ISPCS), 2012 International IEEE Symposium.
Invitation to Pay Fees and Partial International Search Report in Corresponding PCT/IB2013/000633, mailed Jul. 22, 2013.

(56) References Cited

OTHER PUBLICATIONS

Mills, D.L. "Internet Time Synchronization: The Network Time Protocol," Network Working Group Request for Comments, No. 1129, Oct. 1, 1989.
Shpiner et al., "Multi-Path Time Synchronization," Internet Engineering Task Force, IETF, Standard Working Draft, Internet Society (Isoc) Geneva, Switzerland, Oct. 15, 2012.
Augustin, Brice, et al., "Measuring Load-balanced Paths in the Internet," Internet Measurement Conference 2007 (IMC '07), San Diego, California, 12 pages (Oct. 2007).
Augustin, Brice, et al., Measuring Multipath Routing in the Internet, *IEEE/ACM Transactions on Networking*, Vo.. 19, No. 3, pp. 830-840 (Jun. 2011).
He, Yihua, et al., "On Routing Asymmetry in the Internet," *Global Telecommunications Conference 2005 (GLOBECOM '05)*, IEEE vol. 2, 7 pages (Nov. 2005).
Mills, David L., "Improved Algorithms for Synchronizing Computer Network Clocks 1,2," *Association for Computing Machinery*, 11 pages (1994).
Mills, David L., "Internet Time Synchronization: the Network Time Protocol 1,2," IEEE Transactions on Communications, 14 pages.
Mizrahi, Tal, "Security Requirements of Time Synchronization Protocols in Packet Switched Networks," TICTOC Working Group, Internet Draft, 32 pages (Feb. 7, 2013).
Narasimhan, Janardhanan, et al., "Traceflow," Internet Draft, 43 pages (Jan. 23, 2012).
Pathak, Abhinav, et al., A Measurement Study of Internet Delay Asymmetry, *Passive and Active Network Measurement, 9th International Conference, PAM 2008*, Cleveland, OH, 10 pages (Apr. 2008).
Notice of Allowance for U.S. Appl. No. 13/764,732, dated Jan. 7, 2015 (9 pages).
Office Action for U.S. Appl. No. 14/175,858, dated Jan. 30, 2015 (17 pages).
International Search Report in PCT/IB2013/001506, dated Oct. 30, 2013 (5 pages).
Written Opinion in PCT/IB2013/001506, dated Oct. 30, 2013 (6 pages).
International Preliminary Report on Patentability in International Application No. PCT/IB2013/001506, dated Nov. 11, 2014 (6 pages).

* cited by examiner

CLOCK SYNCHRONIZATION IN THE PRESENCE OF SECURITY THREATS

CROSS-REFERENCES TO RELATED APPLICATIONS

This application claims the benefit of:
U.S. Provisional Patent Application No. 61/644,722, entitled "Slave Diversity: Using Multiple Paths to Improve the Accuracy of Clock Synchronization Protocols," filed on May 9, 2012;
U.S. Provisional Patent Application No. 61/644,738, entitled "Using Multiple Paths to Mitigate the Delay Attack in Clock Synchronization Protocols," filed on May 9, 2012;
U.S. Provisional Patent Application No. 61/647,087, entitled "Game Theoretic Analysis of Delay Attacks Against Time Synchronization Protocols," filed on May 15, 2012;
U.S. Provisional Patent Application No. 61/647,123, entitled "Slave Diversity: Using Multiple Paths to Improve the Accuracy of Clock Synchronization Protocols," filed on May 15, 2012;
U.S. Provisional Patent Application No. 61/695,367, entitled "Multi-Path Time Protocols," filed on Aug. 31, 2012;
U.S. Provisional Patent Application No. 61/695,371, entitled "Multi-Masters Precision Time Protocols," filed on Aug. 31, 2012; and
U.S. Provisional Patent Application No. 61/706,526, entitled "Multi-Path Time Protocols," filed on Sep. 27, 2012.

Additionally, this application is a continuation-in-part of U.S. patent application Ser. No. 13/764,732, entitled "Clock Synchronization Using Multiple Network Paths," filed on Feb. 11, 2013, which claims the benefit of, inter alia, U.S. Provisional Patent Application No. 61/597,092, entitled "Time Synchronization Diversity," filed on Feb. 9, 2012.

The disclosures of all of the above-referenced applications are incorporated herein by reference in their entireties

FIELD OF THE DISCLOSURE

The present disclosure relates generally to devices that maintain a clock and, more particularly, to techniques for synchronizing clocks across a network.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Clock synchronization protocols are commonly used in packet-based networks to synchronize clocks maintained at different network devices. In such clock synchronization protocols, a first network device, which maintains a master clock, transmits a protocol message including a master clock time to a second network device, which maintains a slave clock. The second network device utilizes the master clock time and an estimated network latency to adjust the slave clock in order to synchronize the slave clock with the master clock.

Additionally, such clock synchronization protocols are exposed to security threats. For example, in a so-called delay attack, a malicious man-in-the-middle adversary selectively adds delay to clock synchronization time-stamped packets sent between the master clock and the slave clock. The delay attack prevents the second network device discussed above from correctly measuring the network latency, and thus proper synchronization between the slave clock and the master clock is frustrated.

SUMMARY

In one embodiment, a network device comprises one or more ports to communicatively couple the network device to a master clock via a plurality of different communication paths, and a clock synchronization module configured to determine a plurality of path time data sets corresponding to the plurality of different communication paths based on signals received from the master clock via the plurality of different communication paths between the network device and the master clock. The network device also comprises a clock module configured to determine that at least one of the plurality of path time data sets is inaccurate based on accuracy metrics corresponding to the plurality of path time data sets, and determine a time of day as a function of a remainder of one or more path time data sets, in the plurality of path time data sets, not determined to be inaccurate.

In various other embodiments, the network device comprises any combination of the following features.

The clock module is configured to determine that the at least one of the plurality of path time data sets is inaccurate based on a plurality of difference measures, wherein each difference measure indicates how much a respective path time data set in the plurality of path time data sets varies from other path time data sets in the plurality of path time data sets.

The clock module is configured to calculate each difference measure at least by selecting a respective path time from a plurality of path times, determining an average of other path times in the plurality of path times, and calculating the difference measure based on a difference between the respective path time and the average.

The clock module is configured to calculate the difference measure based on the absolute value of the difference between the respective path time and the average.

The clock module is configured to, for each path time data set, compare the corresponding difference measure to a threshold, and determine whether to include the path time data set in a group based on the comparison of the corresponding difference measure to the threshold.

The group includes the remainder of the one or more path time data sets not determined to be inaccurate.

The clock is configured to include the path time data set in the group when the clock module determines that the corresponding difference measure does not meet the threshold.

The clock module is configured to omit the path time data set from the group when the clock module determines that the corresponding difference measure meets the threshold.

The clock module is configured to determine the time of day at least by calculating an average of the remainder of the one or more path time data sets not determined to be inaccurate, and setting the time of day as the average.

The clock module is configured to determine the time of day based on selecting one of the one or more path time data sets not determined to be inaccurate.

In another embodiment, a method includes receiving, at one or more ports of a network device, signals from a master clock, the signals from the master clock received via a plurality of different communication paths; determining, at the network device, a plurality of path time data sets corresponding to the plurality of different communication paths based on the signals from the master clock received via the plurality of different communication paths; determining, at the network device, that at least one of the plurality of path time data sets is inaccurate based on accuracy metrics corresponding to the plurality of path time data sets; and determining, at the network device, a time of day as a function of a remainder of one or more path time data sets, in the plurality of path time data sets, not determined to be inaccurate.

In various other embodiments, the method includes any combination of the following features.

Determining that the at least one of the plurality of path time data sets is inaccurate comprises determining that the at least one of the plurality of path time data sets is inaccurate based on a plurality of difference measures, wherein each difference measure indicates how much a respective path time data set in the plurality of path time data sets varies from other path time data sets in the plurality of path time data sets.

The method further includes calculating each difference measure by selecting a respective path time from a plurality of path times; determining an average of other path times in the plurality of path times; and calculating the difference measure based on a difference between the respective path time and the average.

The method further includes calculating the difference measure based on the absolute value of the difference between the respective path time and the average.

The method further includes, for each path time data set, comparing the corresponding difference measure to a threshold; and determining whether to include the path time data set in a group based on the comparison of the corresponding difference measure to the threshold.

The group includes the remainder of the one or more path time data sets not determined to be inaccurate.

The method further includes, when the corresponding difference measure does not meet the threshold, including the path time data set in the group.

The method further includes, when the corresponding difference measure meets the threshold, omitting the path time data set from the group.

The method determines the time of day by calculating an average of the remainder of the one or more path time data sets not determined to be inaccurate; and setting the time of day as the average.

The method determines the time of day by selecting one of the one or more path time data sets not determined to be inaccurate.

DETAILED DESCRIPTION

Figure 1A:
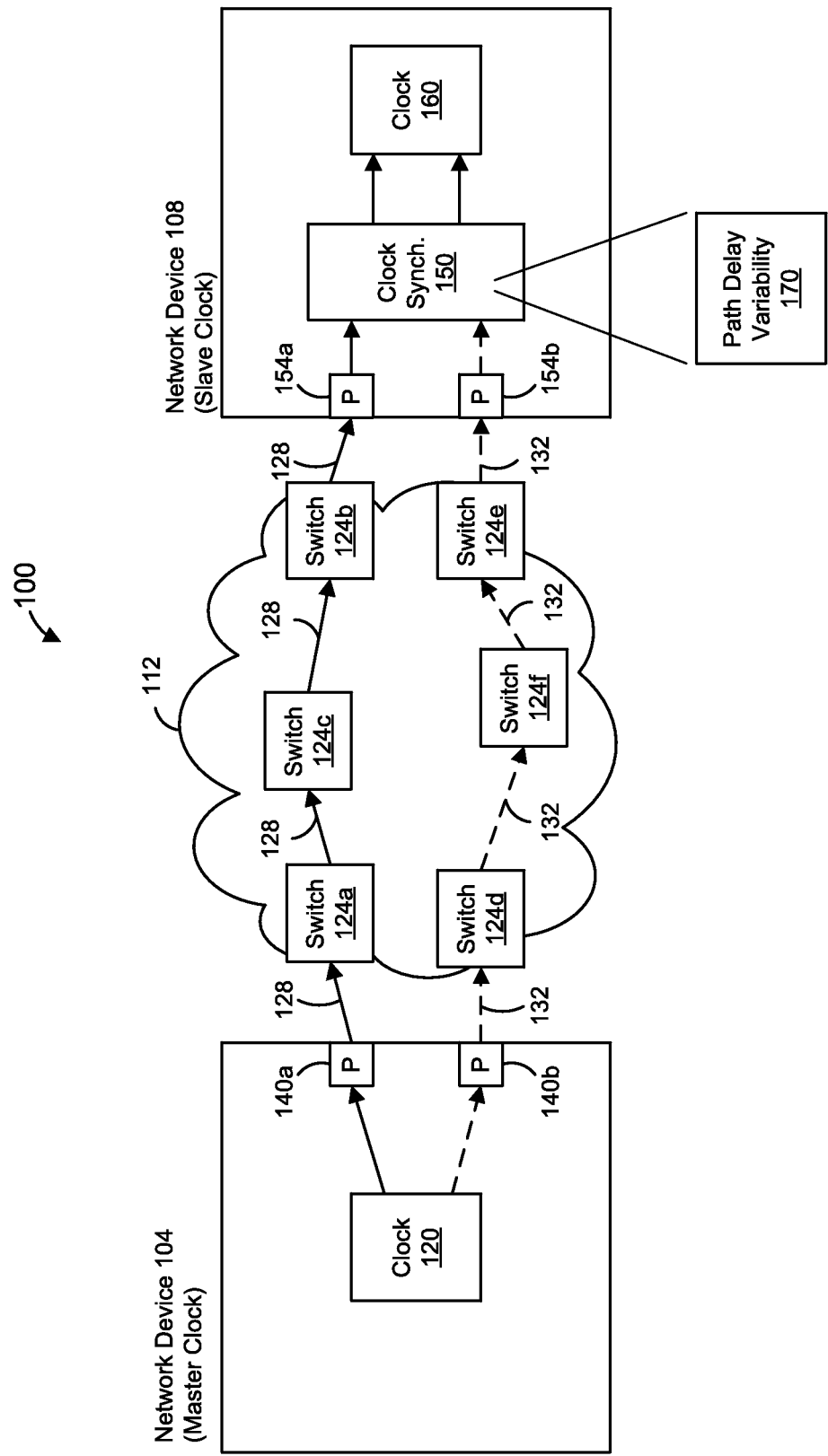
FIG. 1A is a block diagram of an example system in which a slave clock is maintained based on a master clock and based on signals transmitted by the master clock via multiple paths in a network, according to an embodiment.

FIG. 1A is a block diagram of an example system 100, according to an embodiment, having a first network device 104 communicatively coupled to a second network device 108 via a communication network 112. The first network device 104 implements a master clock, and the first network device 104 is sometimes referred to herein as the master clock device 104. The second network device 108 implements a slave clock, and the second network device 108 is sometimes referred to herein as the slave clock device 108.

The master clock device 104 includes a clock module 120 configured to maintain the master clock. In an embodiment, the master clock is a time-of-day clock. In another embodiment, the master clock is a counter not directly linked to a time-of-day. In an embodiment, the clock module 120 includes or utilizes a counter circuit that maintains the master clock. In an embodiment, the clock module 120 is an application layer module operating at an application layer in a multi-layer communication protocol stack. In an embodiment, the multi-layer communication protocol stack (e.g., the Transport Control Protocol/Internet Protocol (TCP/IP) protocol suite) comprises a link layer, an Internet layer, a transport layer, and the application layer, where the application layer is above the transport layer, the Internet layer, and the link layer in the protocol stack. In another embodiment, the multi-layer communication protocol stack (e.g., corresponding to the Open Systems Interconnection (OSI) model) comprises a physical layer, a data link layer, a network layer, a transport layer, a session layer, a presentation layer, and the application layer, where the application layer is above the presentation layer, the session layer, the transport layer, the network layer, the data link layer, and the physical layer in the protocol stack. In other embodiments, the clock module 120 operates at another suitable layer at least at a fourth layer in a multi-layer communication protocol stack.

The clock module 120 is configured to cause a plurality of time-stamped packets to be transmitted from the master clock device 104 to the slave clock device 108 via respective different communication paths through the network 112. The plurality of time-stamped packets are time-stamped with one or more values of the master clock maintained by the clock module 120, in an embodiment.

The network 112 comprises one or more of a private network, a public network, a backbone network, a provider network, the Internet, etc. The network 112 comprises a plurality of network switches and/or routers 124 (referred to hereinafter as switches merely for brevity), in an embodiment, and a first path 128 corresponds to a link from the switch 124*a* to the switch 124*b* via the switch 124*c*. A second path 132 corresponds to a link from the switch 124*d* to the switch 124*e* via the switch 124*f*.

The clock module 120 is configured to cause a first time-stamped packet to be transmitted from the master clock device 104 to the slave clock device 108 via the path 128, and to cause a second time-stamped packet to be transmitted from the master clock device 104 to the slave clock device 108 via the path 132. In an embodiment, the master clock device 104 includes multiple ports 140, and the clock module 120 is configured to cause the first time-stamped packet to be transmitted via the port 140*a* and the second time-stamped packet to be transmitted via the port 140*b*. In other embodiments and/or scenarios, each of at least some of the time-stamped packets are transmitted via the same port 140 (not shown in FIG. 1A). Although two ports 140 are illustrated in FIG. 1A, in other embodiments, the master clock device 104 includes another suitable number of ports 140 (e.g., only one port or more than two ports).

In one embodiment, the master clock device 104 includes only a single port 140, and path diversity is entirely provided by the network 112. For example, in locally administered networks 112, switches/routers can be configured to utilize different paths when transmitting packets destined for the same endpoint device but including different header information (e.g., source addresses, destination addresses, Layer 4 ports, etc.), in some embodiments. As another example, public and/or provider networks, at least some switches/routers in the network 112 apply load balancing techniques in which packets destined for the same endpoint device are directed along different paths based upon different header information in the packets (e.g., source addresses, destination addresses, Layer 4 ports, etc.), in some embodiments. Thus, to cause the network 112 to transmit packets to the slave clock device 108 via different paths, the master clock device 104 varies header information in the packets (e.g., source addresses, destination addresses, Layer 4 ports, etc.), in some embodiments.

Unlike the depiction in FIG. 1A, which shows different ports 140 coupled to different ones of the switches 124, in some embodiments, two or more of the ports 140 are coupled to a single switch 124. In such embodiments, at least some of the different network paths pass through different ports of the single switch 124 coupled to the two or more ports 140 of the master clock device 104. For example, in locally administered networks 112, switches/routers can be configured to utilize different paths when transmitting packets destined for the same endpoint device but including different header information (e.g., source addresses, destination addresses, Layer 4 ports, etc.) and/or when the packets are received via different physical ports of the switch/router, in some embodiments. As another example, public and/or provider networks, at least some switches/routers in the network 112 apply load balancing techniques in which packets destined for the same endpoint device are directed along different paths based upon different header information in the packets (e.g., source addresses, destination addresses, Layer 4 ports, etc.) and/or based on the physical ports of the switch/router via which the packets are received, in some embodiments. Thus, to cause the network 112 to transmit packets to the slave clock device 108 via different paths, the master clock device 104 varies header information in the packets (e.g., source addresses, destination addresses, Layer 4 ports, etc.) and/or transmits packets via different physical ports of the master clock device 104, where the different physical ports of the master clock device 104 are respectively coupled to different physical ports of the switch 124, in some embodiments.

A clock synchronization module 150 of the slave clock device 108 is configured to determine different clock results corresponding to the plurality of time-stamped packets transmitted by the master clock device 104, and corresponding to the plurality of different communication paths through the network 112. For example, the clock synchronization module 150 is configured to determine a first clock result corresponding to the first time-stamped packet transmitted via the first path 128, and a second clock result corresponding to the second time-stamped packet transmitted via the second path 132. In an embodiment, the slave clock device 108 includes multiple ports 154, and the first time-stamped packet is received via the port 154*a* and the second time-stamped packet is received via the port 154*b*. In other embodiments and/or scenarios, each of at least some of the time-stamped packets are received via the same port 154 (not shown in FIG. 1A). Although two ports 154 are illustrated in FIG. 1A, in other embodiments, the slave clock device 108 includes another suitable number of ports 154 (e.g., only one or more than two ports). In an embodiment, the slave clock device 108 includes only a single port 154.

The clock synchronization module 150 is configured to determine each clock result based on a respective time stamp in the respective time-stamped packet transmitted via the respective path. In an embodiment, each clock result generated by the clock synchronization module comprises an offset between the master clock maintained at the master clock device 104 and a slave clock maintained at the slave clock device 108. For example, the clock synchronization module 150 is configured to determine each offset based on (i) the respective time stamp in the respective time-stamped packet transmitted via the respective path, and (ii) a value of the slave clock at a respective time at which the respective time-stamped packet was received by the slave clock device 108, in an embodiment. As an illustrative example, in an embodiment, the clock synchronization module 150 determines a first offset based on (i) a first time stamp in the first time-stamped packet transmitted via the first path 128, and (ii) a first value of the slave clock at a first time at which the first time-stamped packet was received by the slave clock device 108; and the clock synchronization module 150 determines a second offset based on (i) a second time stamp in the second time-stamped packet transmitted via the second path 132, and (ii) a second value of the slave clock at a second time at which the second time-stamped packet was received by the slave clock device 108.

In another embodiment, each clock result generated by the clock synchronization module 150 comprises a clock value (e.g., a time-of-day value) corresponding to the master clock maintained at the master clock device 104. For example, the clock synchronization module 150 is configured to determine each clock value based on the respective time stamp in the respective time-stamped packet transmitted via the respective path, in an embodiment. As an illustrative example, in an embodiment, the clock synchronization module 150 determines a first clock value based on the first time stamp in the first time-stamped packet transmitted via the first path 128, and determines a second clock value based on the second time stamp in the second time-stamped packet transmitted via the second path 132. In an embodiment, the clock synchronization module 150 is an application layer module operating at the application layer in the multi-layer communication protocol stack. In other embodiments, the clock synchronization module 150 operates at another suitable layer at least at a fourth layer in a multi-layer communication protocol stack. In other embodiments, the clock synchronization module 150 is at another suitable layer below an application layer and/or operates at a suitable layer below the fourth layer in the multi-layer communication protocol stack.

As will be described in more detail below, the clock synchronization module 150 is configured to maintain, for each path, a respective path time data set that includes a respective path-dependent clock, or information for generating the respective clock result such as a respective path delay measurement, a respective clock offset, etc., in some embodiments. In some embodiments, the clock synchronization module 150 uses the path time data sets to generate the clock results. In other embodiments, the clock results are the path time data sets or are included in the path time data sets. In some embodiments in which the clock synchronization module 150 is configured to maintain respective path-dependent clocks, the clock synchronization module 150 includes or utilizes respective counter circuits that maintain the different path-dependent clocks.

A clock module 160 in the slave clock device 108 is configured to maintain the slave clock, in some embodiments. In an embodiment, the slave clock is a time-of-day clock. In another embodiment, the slave clock is a counter not directly linked to a time-of-day. In an embodiment, the clock module 160 includes or utilizes a counter circuit that maintains the slave clock. In an embodiment, the clock module 160 is an application layer module operating at the application layer in the multi-layer communication protocol stack. In other embodiments, the clock module 160 operates at another suitable layer at least at a fourth layer in a multi-layer communication protocol stack. In some embodiments in which the clock synchronization module 150 is configured to maintain respective path-dependent clocks, the clock module 160 is configured to select one of the path-dependent clocks as the slave clock rather than maintaining a separate slave clock.

The clock module 160 is configured to determine the slave clock value using the plurality of clock results generated by the clock synchronization module 150, in some embodiments. In an embodiment, the clock module 160 is configured to determine the slave clock value at least by mathematically combining the plurality of clock results generated by the clock synchronization module 150. In another embodiment, the clock module 160 is configured to determine the slave clock value at least by selecting one of the plurality of clock results generated by the clock synchronization module 150. For example, one of the clock results is determined to be most accurate based on independently determined accuracy metrics for each path such as path length, path delay variability (or noisiness) etc., in some embodiments. In another embodiment, the clock module 160 is configured to determine the slave clock value at least by (i) combining at least some of the plurality of clock results generated by the clock synchronization module 150 in some situations, and (ii) selecting one of the plurality of clock results generated by the clock synchronization module 150 in other situations. In another embodiment, the clock module 160 is configured to determine the slave clock value at least by (i) selecting a subset of the plurality of clock results generated by the clock synchronization module 150, and (ii) combining the subset of clock results. For example, the selected subset is the clock result(s) that are determined to be suitably accurate based on independently determined accuracy metrics for each path such as path length, path delay variability (or noisiness) etc., in some embodiments.

In some embodiments in which the clock results generated by the clock synchronization module 150 comprise offsets, the clock module 160 is configured to determine the slave clock value at least by mathematically combining two or more of the plurality of offsets to generate a combined offset, and then use the combined offset to set the slave clock value. In some embodiments in which the clock results generated by the clock synchronization module 150 comprise offsets, the clock module 160 is configured to select one of the plurality of offsets, and then use the selected offset to set the slave clock value. For example, one of the offsets is determined to be most accurate based on independently determined accuracy metrics for each path such as path length, path delay variability (or noisiness) etc., in some embodiments. In some embodiments in which the clock results generated by the clock synchronization module 150 comprise offsets, the clock module 160 is configured to, (i) in some situations, mathematically combine the plurality of offsets to generate the combined offset, and then use the combined offset to set the slave clock value, and (ii) in other situations, select one of the plurality of offsets, and then use the selected offset to set the slave clock value. In an embodiment, the clock module 160 is configured to determine the slave clock value at least by (i) selecting a subset of the plurality offsets, and (ii) combining the subset of offsets. For example, the selected subset is the offset(s) that are determined to be suitably accurate based on independently determined accuracy metrics for each path such as path length, path delay variability (or noisiness) etc., in some embodiments.

In some embodiments in which the clock results generated by the clock synchronization module 150 comprise different clock values corresponding to different paths (path clock values), the clock module 160 is configured to determine the slave clock value at least by mathematically combining two or more of the different path clock values to generate a combined clock value, and then use the combined clock value to set the slave clock value. In some embodiments in which the clock results generated by the clock synchronization module 150 comprise path clock values, the clock module 160 is configured to select one of the path clock values, and then use the selected path clock value to set the slave clock value. For example, one of the clock values is determined to be most accurate based on independently determined accuracy metrics for each path such as path length, path delay variability (or noisiness) etc., in some embodiments. In some embodiments in which the clock results generated by the clock synchronization module 150 comprise path clock values, the clock module 160 is configured to, (i) in some situations, mathematically combine at least some of the path clock values to generate the combined clock value, and then use the combined clock value to set the slave clock value, and (ii) in other situations, select one of the path clock values, and then use the selected path clock value to set the slave clock value.

In an embodiment, the clock module 160 is configured to calculate an average of at least some of the clock results generated by the clock synchronization module 150, and to determine the slave clock value based on the average clock result. In some embodiments in which the clock results generated by the clock synchronization module 150 comprise offsets, the clock module 160 is configured to calculate an average of at least some of the offsets, and to determine the slave clock value based on the average offset. In some embodiments in which the clock results generated by the clock synchronization module 150 comprise different clock values corresponding to different paths (path clock values), the clock module 160 is configured to calculate an average of at least some of the path clock values, and to determine the slave clock value based on the average clock value. In an embodiment, the clock module 160 is configured to determine the slave clock value at least by (i) selecting a subset of the plurality path clock values, and (ii) combining the subset of path clock values. For example, the selected subset is the path clock value(s) that are determined to be suitably accurate based on independently determined accuracy metrics for each path such as path length, path delay variability (or noisiness) etc., in some embodiments.

In some embodiments, the clock module 160 is configured to calculate a weighted average of at least some of the clock results. In an embodiment, weights utilized in calculating the weighted average are determined based on independently determined accuracy metrics for each path such as path length, path delay variability (or noisiness) etc. For example, relatively lesser weight is given to a path with a relatively longer length, whereas relatively greater weight is given to a path with a relatively shorter length, in an embodiment. As another example, relatively lesser weight is given to a path with a relatively higher variability (or noisiness) in path delay, whereas relatively greater weight is given to a path with a relatively lower variability (or noisiness) in path delay, in an embodiment.

For example, in an embodiment, the clock synchronization module 150 includes a path delay variability determination module 170 configured to generate respective measures of path delay variability for the different paths through the network 112. In an embodiment, the clock synchronization module 150 is configured to utilize the measures of path delay variability for the different paths through the network 112 to determine the different weights utilized in calculating the weighted average. For example, relatively lesser weight is given to a path with a relatively higher variability (or noisiness) in path delay, whereas relatively greater weight is given to a path with a relatively lower variability (or noisiness) in path delay, in an embodiment.

In an embodiment, the path delay variability determination module 170 is configured to generate respective path delay measures for the different paths through the network 112. In an embodiment, each path delay measure is a measure of a one-way delay from the master clock device 104 to the slave clock device 108 via the respective path. In an embodiment, the path delay variability determination module 170 is configured to generate, for each path, the one-way delay by (i) determining a round-trip delay from the slave clock device 108 to the master clock device 104 and back to the slave clock device 108 via the respective path, and (ii) calculating the one-way delay based on the round trip delay. In an embodiment, the one-way delay is calculated as one half of the round-trip delay.

In an embodiment, the path delay variability determination module 170 is configured to generate respective average path delays for the different paths through the network 112. In an embodiment, the path delay variability determination module 170 is configured to generate, for each path, the respective measure of path delay variability based on the respective average path delay and a respective recent (e.g., most recent) path delay measure. In an embodiment, the path delay variability determination module 170 is configured to generate, for each path, the respective measure of path delay variability based on calculating a difference between the respective average path delay and the respective recent (e.g., most recent) path delay measure. The magnitude of the difference calculated for a path generally indicates a degree of variability in the path delay for the path, in an embodiment. For example, if a magnitude of a first difference calculated for a first path is greater than a magnitude of a second difference calculated for a second path, it is assumed that the path delay in the first path has a greater degree of variability than the path delay in the second path, in an embodiment.

In some embodiments in which the clock results generated by the clock synchronization module 150 comprise offsets, the clock module 160 is configured to select one of the offsets based on measures of path delay variability for the different paths, and then use the selected offset to set the slave clock value. For example, in an embodiment, the clock module 160 is configured to select an offset corresponding to a path with a lowest measure of path delay variability, and then use the selected offset to set the slave clock value.

In some embodiments in which the clock results generated by the clock synchronization module 150 comprise offsets, the clock module 160 is configured to select a set of the offsets that are each associated with a measure of path delay variability that meets one or more criteria, and to determine an offset using the set of selected offsets. For example, in an embodiment, the clock module 160 is configured to select a set of the offsets that are each associated with a measure of path delay variability that meets a threshold (e.g., is less than the threshold, is less than or equal to the threshold, etc.), and to determine an offset using the set of selected offsets. For example, in an embodiment, if there are multiple offsets in the set, the clock module 160 is configured to calculate an average of the selected offsets, and to determine the slave clock value using the average offset. In an embodiment, paths with high variability are not considered when calculating the average such that only paths with a measured variability less than a suitable variability threshold are used when calculating the average. In an embodiment, if there is only one path with a measured variability less than the suitable variability threshold, the corresponding one offset is used to set the slave clock value (i.e., an average of multiple offsets is not calculated). In other words, in an embodiment, if there is only one offset in the set, the clock module 160 is configured to set the slave clock using the selected offset.

In some embodiments in which the clock results generated by the clock synchronization module 150 comprise different clock values corresponding to different paths (path clock values), the clock module 160 is configured to select one of the path clock values based on measures of path delay variability for the different paths, and then use the selected path clock value to set the slave clock value. For example, in an embodiment, the clock module 160 is configured to select a path clock value corresponding to a path with a lowest measure of path delay variability, and then use the selected path clock value to set the slave clock value.

In some embodiments in which the clock results generated by the clock synchronization module 150 comprise different clock values corresponding to different paths (path clock values), the clock module 160 is configured to select a set of the path clock values that are each associated with a measure of path delay variability that meets one or more criteria, and to determine an average path clock value using the set of selected path clock values. For example, in an embodiment, the clock module 160 is configured to select a set of the path clock values that are each associated with a measure of path delay variability that meets a threshold (e.g., is less than the threshold, is less than or equal to the threshold, etc.), and to determine slave clock value using the set of selected path clock values. For example, in an embodiment, if there are multiple path clock values in the set, the clock module 160 is configured to calculate an average of the selected path clock values, and to determine the slave clock value using the average path clock value. As another example, in an embodiment, if there is only one path clock value in the set, the clock module 160 is configured to set the slave clock using the selected path clock value.

In some embodiments, the clock synchronization module 150 is configured to measure respective path characteristics for each path such as path length, path delay variability (or noisiness), etc., and/or measured characteristics of respective path clock values, such as degree of jitter. In an embodiment, the path length is measured in terms of a number of hops. For example, in some embodiments, Traceroute-based path discovery techniques are utilized to determine the number of hops in a path. In some embodiments, the clock synchronization module 150 is configured to measure respective path characteristics for each path such as path length, path delay variability (or noisiness), etc., and/or measured characteristics of respective path clock values, such as degree of jitter.

Figure 1B:
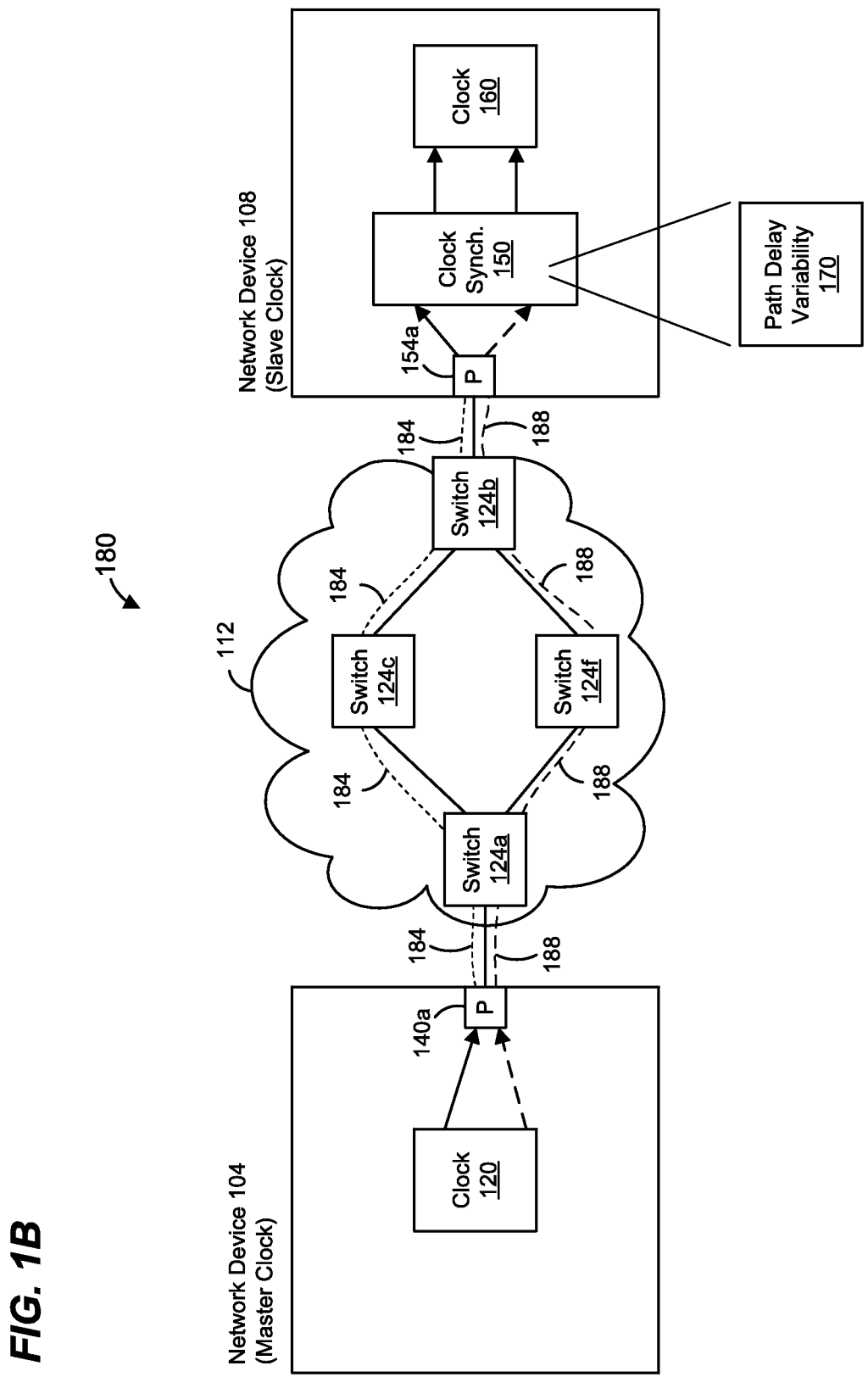
FIG. 1B is a block diagram of another example system in which a slave clock is maintained based on a master clock and based on signals transmitted by the master clock via multiple paths in a network, according to an embodiment.

FIG. 1B is a block diagram of another example system 180 which the master clock device 104 includes only a single port 140a and the slave clock device 108 includes only a single port 154a. Path diversity is entirely provided by the network 112. As discussed above, for example, switches 124 are configured to utilize different paths 184, 188 when transmitting packets destined for the same endpoint device but including different header information (e.g., source addresses, destination addresses, Layer 4 ports, etc.), in some embodiments. As another example, switches 124 apply load balancing techniques in which packets destined for the same endpoint device are directed along different paths 184, 188 based upon different header information in the packets (e.g., source addresses, destination addresses, Layer 4 ports, etc.), in some embodiments. Thus, to cause the network 112 to transmit packets to the slave clock device 108 via different paths 184, 188, the master clock device 104 varies header information in the packets (e.g., source addresses, destination addresses, Layer 4 ports, etc.), in some embodiments.

Figure 2A:
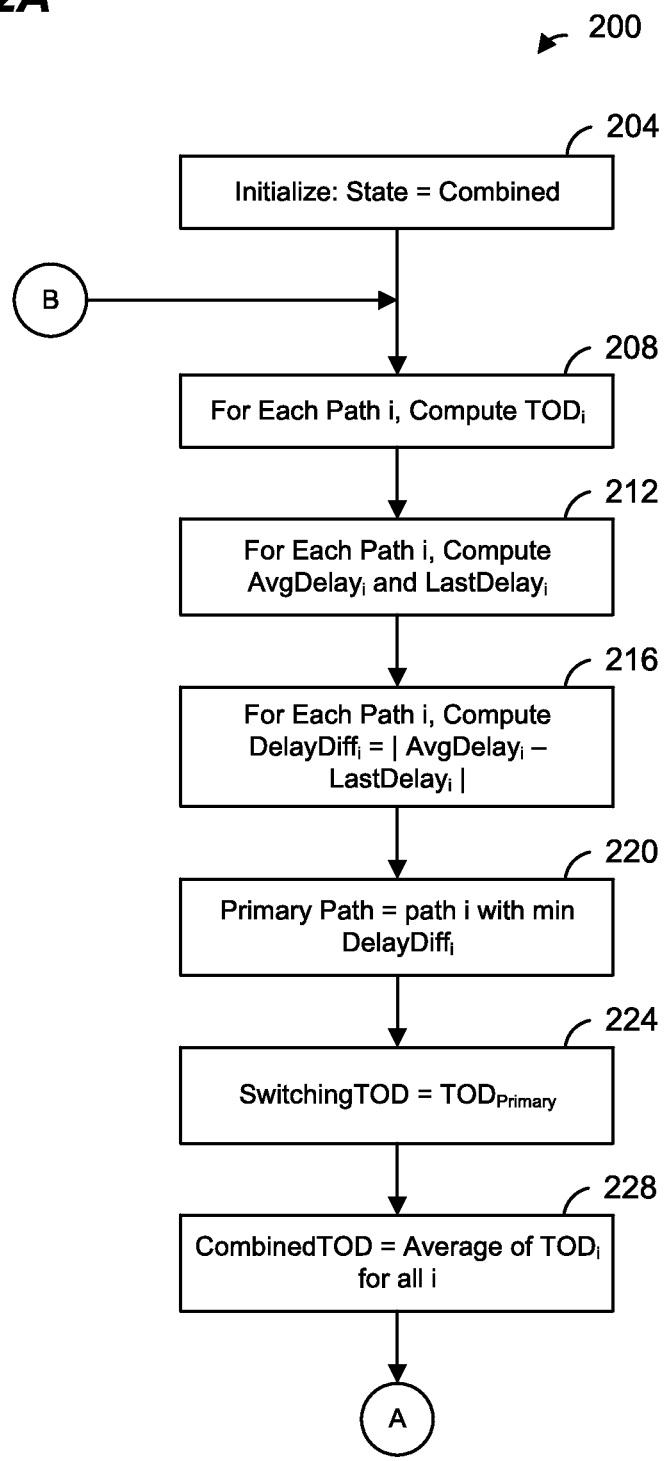
FIGS. 2A and 2B are a flow diagram of an example method for maintaining a slave clock using multiple clock signals received from a master clock via multiple paths in a network, according to an embodiment.
Figure 2B:
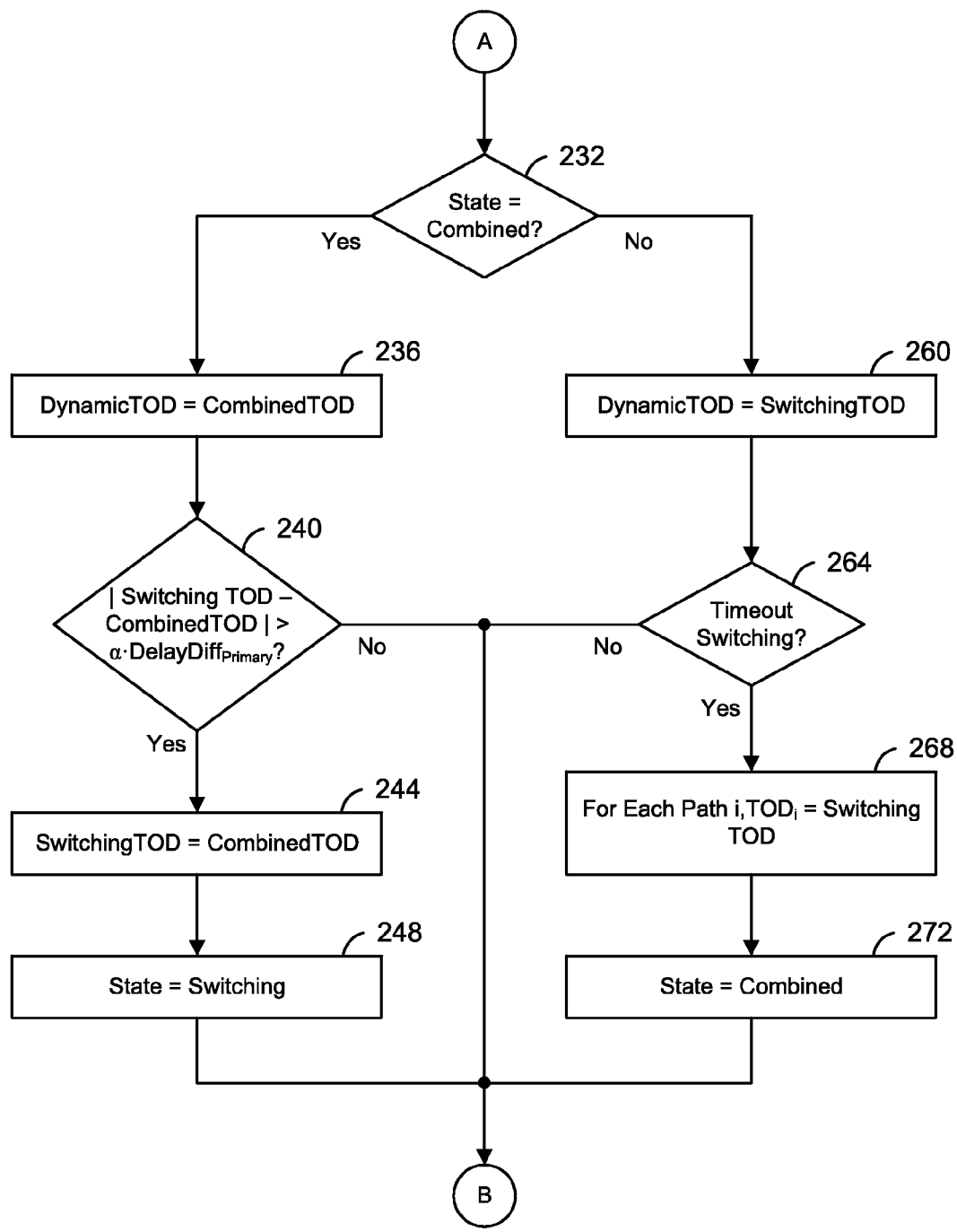

FIGS. 2A and 2B are a flow diagram of an example method 200 for maintaining a slave clock using multiple clock signals received from a master clock via multiple paths in a network, according to an embodiment. The slave clock device 108 of FIG. 1A and/or FIG. 1B is configured to implement the method 200, in an embodiment, and the method 200 is discussed with reference to FIGS. 1A and 1B for explanatory purposes. In other embodiments, however, the method 200 is implemented by another suitable device.

At block 204, a state variable is initialized to a value COMBINED. The state variable generally indicates how the slave clock is to be set. For example, when the state variable is a value COMBINED, the slave clock is to be set according to a first technique (as described below), and when the state variable is a value SWITCHING, the slave clock is to be set according to a second technique (as described below), in an embodiment.

At block 208, a respective clock (e.g., a respective time of day clock ($TOD_i$)) is determined for each of a plurality of paths via which clock signals are received from the master clock device 104. For example, a $TOD_1$ is determined for clock signals from the master clock device 104 received via path 128, and $TOD_2$ is determined for clock signals from the master clock device 104 received via path 132. Block 208 comprises determining a respective $TOD_i$ each time a clock signal from the master clock is received via the respective path i, in an embodiment.

At block 212, a most recent measure of a delay from the master clock device 104 to the slave clock device 108 via the path i ($LastDelay_i$) is determined for each path i. For example, in order to measure the LastDelay for the i-th path, the slave clock device 108 transmits a path delay measurement packet (e.g., an Internet Control Message Protocol (ICMP) echo request packet) to the master clock device 104, which prompts the master clock device 104 to immediately transmit a response packet (e.g., an ICMP response) to the slave clock device 108 via the path i, in an embodiment. The slave clock device 108 then measures the round-trip delay corresponding to the path i based on when the ICMP echo request packet was transmitted and when the ICMP response was received via the path i, and determines the $LastDelay_i$ as one half the round-trip delay, in an embodiment. Such measurements are made periodically, according to a schedule, etc., in various embodiments.

Also at block 212, an average delay from the master clock device 104 to the slave clock device 108 via the path i ($AvgDelay_i$) is determined for each path i. For example, the $AvgDelay_i$ is calculated by averaging multiple $LastDelay_i$ values over time, in an embodiment. As each $LastDelay_i$ for the i-th path is calculated, the $AvgDelay_i$ is updated with the new $LastDelay_i$ value, in an embodiment.

At block 216, respective measures of path delay variability for the different paths are calculated. For example, an absolute value of the difference ($DelayDiff_i$) between the $AvgDelay_i$ and the $LastDelay_i$ is calculated for each path i, in an embodiment. For example, a larger $DelayDiff_i$ indicates relatively more variability as compared to a smaller $DelayDiff_i$ in an embodiment. As each $LastDelay_i$ for the i-th path is calculated, the $AvgDelay_i$ is updated, as discussed above, and then a new $DelayDiff_i$ is calculated, in an embodiment.

In some embodiments, the respective measures of path delay variability for the different paths also provide a measure of noisiness of the respective $TOD_i$'s. For example, as the path delay variability for the i-th path increases, jitter (or noisiness) of the TOD for the i-th path will also increase, in an embodiment. In other embodiments, respective measures of noisiness of the respective $TOD_i$'s are determined by analyzing the respective $TOD_i$'s over time.

At block 220, a primary path is selected as the path with the lowest measure of path delay variability. For example, the primary path is selected as the paths with the lowest $DelayDiff_i$. In other embodiments, the primary path is selected based on one or more suitable measured characteristics of the individual TODs, such as degree of jitter.

At block 224, a first TOD (SwitchingTOD) is set to the $TOD_i$ (determined at block 208) corresponding to the primary path (determined at block 220). As will be explained below, the SwitchingTOD is used when the state variable is set to SWITCHING. The SwitchingTOD corresponds to the $TOD_i$ of the path with the lowest measure of path delay variability, in an embodiment. In other embodiments, the SwitchingTOD corresponds to the $TOD_i$ of a path selected based on measured characteristics of the individual TODs, such as degree of jitter.

At block 228, a second TOD (CombinedTOD) is set to an average of the $TOD_i$'s for all of the paths (determined at block 208). As will be explained below, the CombinedTOD is used when the state variable is set to COMBINED. In an embodiment, block 228 comprises calculating a weighted average. In an embodiment, weights for calculating the weighted average are determined based on the $DelayDiff_i$ values calculated at block 216. Thus, in some embodiments, the weights for calculating the weighted average are configurable and are determined based on measured path characteristics such as path length, path delay variability (or noisiness), etc., and/or measured characteristics of the individual TODs, such as degree of jitter.

At block 232, it is determined whether the state variable is set to COMBINED. If it is determined that the state variable is set to COMBINED, the flow proceeds to block 236. At block 236, the slave clock (DynamicTOD) is set to the CombinedTOD determined at block 228.

At block 240, the absolute value of a difference between the SwitchingTOD and the CombinedTOD is compared to a threshold. In an embodiment, the threshold is the DelayDiff of the primary path multiplied by a suitable scalar α. If it is determined that the absolute value of the difference between the SwitchingTOD and the CombinedTOD does not meet the threshold (e.g., is less than or equal to the threshold), the state variable remains set to COMBINED, and the flow returns to block 208.

On the other hand, if it is determined at block 240 that the absolute value of the difference between the SwitchingTOD and the CombinedTOD meets the threshold (e.g., is greater than the threshold), this may indicate that the path delay variability in one or more of the paths has increased, and the flow proceeds to block 244. At block 244, the SwitchingTOD is set to the CombinedTOD. In an embodiment, block 244 helps ensure continuity of the DynamicTOD. At block 248, the state variable is set to SWITCHING. In an embodiment, the state variable is set to SWITCHING because the comparison at block 240 indicates that path delay variability in one or more of the paths has increased, which may adversely impact the CombinedTOD. After block 248, the flow returns to block 208.

Referring again to block 232, if it is determined that the state variable has the value SWITCHING, in an embodiment, the flow proceeds to block 260. At block 260, the slave clock (DynamicTOD) is set to the SwitchingTOD determined at block 224.

At block 264, it is determined whether the state variable has been set to the value SWITCHING at least for a timeout period. If it is determined that the state variable has been set to the value SWITCHING for less than the timeout period, in an embodiment, the state variable remains set to SWITCHING, and the flow returns to block 208.

On the other hand, if it is determined that the state variable has been set to the value SWITCHING for at least the timeout period, in an embodiment, the flow proceeds to block 268. At block 268, the $TOD_i$ for each path i is set to the SwitchingTOD. In an embodiment, block 268 helps ensure continuity of the DynamicTOD. At block 272, the state variable is set to COMBINED. After block 272, the flow returns to block 208.

In some embodiments, the $TOD_i$ for each path i, the SwitchingTOD, and the CombinedTOD are calculated offsets between the master clock and the slave clock. In an embodiment, the slave clock (DynamicTOD) is updated using either the CombinedTOD offset (block 236) or the SwitchingTOD offset (block 260). For example, the slave clock is updated by adding the offset to a current value of the slave clock, in an embodiment.

Figure 3:
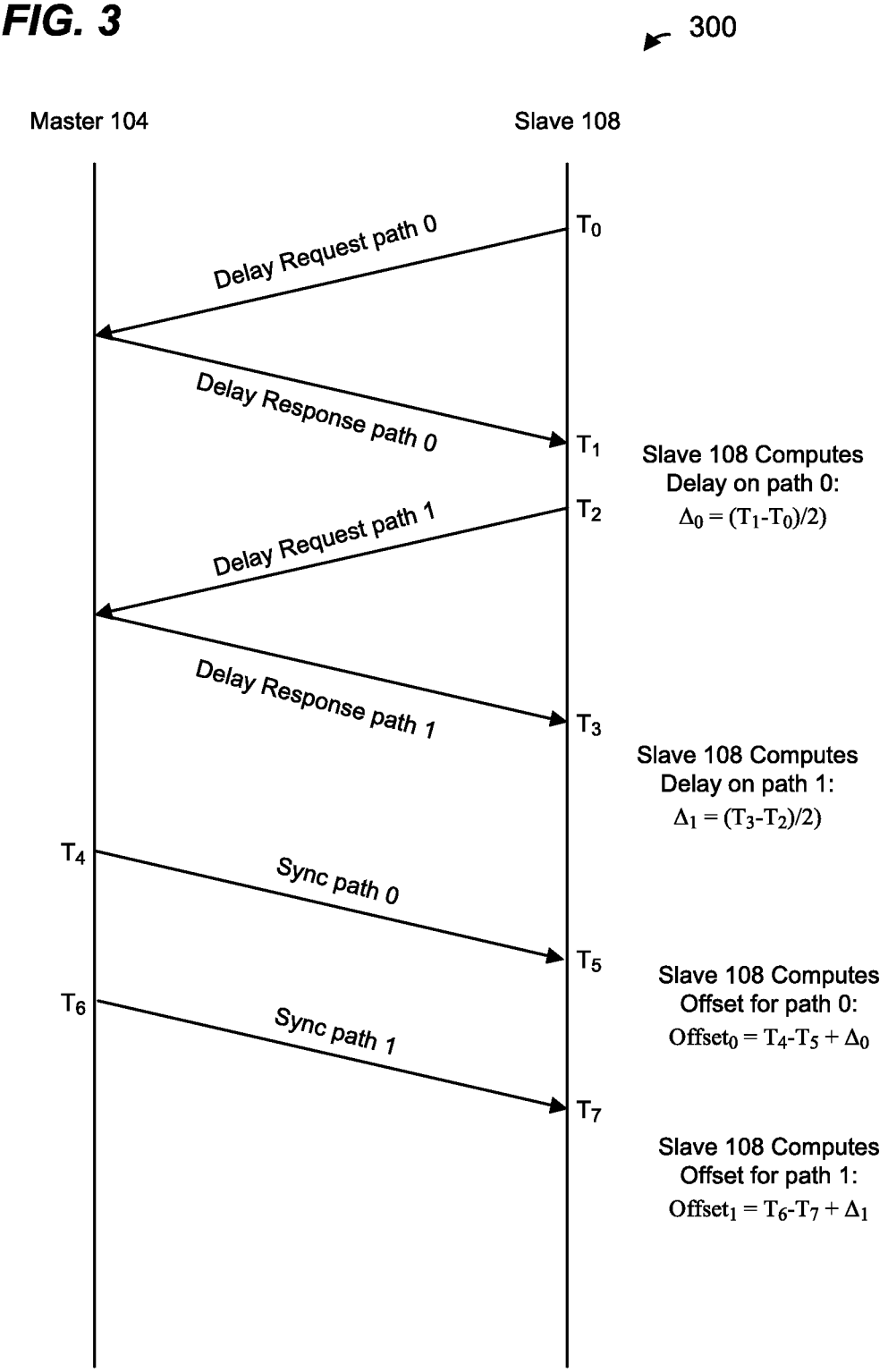
FIG. 3 is a timing diagram illustrating signals exchanged via multiple paths between a slave clock and a master clock, according to an embodiment.

FIG. 3 is a timing diagram 300 illustrating signals exchanged between the slave clock device 108 and the master clock device 104 as part of an example of maintaining the slave clock, according to an embodiment. The scenario illustrated in FIG. 3 involves two different paths in the network 112: path 0 and path 1. In other scenarios, a suitable number of paths greater than two are utilized, at least in some embodiments.

At time $T_0$, the slave clock device 108 transmits a first path delay measurement packet (e.g., ICMP echo request packet) to the master clock device 104, prompting the master clock device 104 to immediately transmit a first response packet (e.g., an ICMP response) to the slave clock device 108 via the path 0, in an embodiment. At time $T_1$, the first response packet (e.g., an ICMP response) transmitted by the master clock device 104 via the path 0 is received at the slave clock device 108, in an embodiment.

After time $T_1$, the slave clock device 108 calculates a delay on path 0 ($\Delta_0$) as one half of the round trip delay:

$$\Delta_0 = (T_1 - T_0)/2. \quad \text{(Equation 1)}$$

At time $T_2$, the slave clock device 108 transmits a second path delay measurement packet (e.g., ICMP echo request packet) to the master clock device 104, prompting the master clock device 104 to immediately transmit a second response packet (e.g., an ICMP response) to the slave clock device 108 via the path 1, in an embodiment. At time $T_3$, the second response packet (e.g., an ICMP response) transmitted by the master clock device 104 via the path 1 is received at the slave clock device 108, in an embodiment.

After time $T_3$, the slave clock device 108 calculates a delay on path 1 ($\Delta_1$) as one half of the round trip delay:

$$\Delta_1 = (T_3 - T_2)/2. \quad \text{(Equation 2)}$$

At time $T_4$, the master clock device 104 transmits a first time-stamped packet to the slave clock device 108 via the path 0. In an embodiment, the first time-stamped packet includes a time stamp equal to (or substantially equal to) a value corresponding to time $T_4$. At time $T_5$, the slave clock device 108 receives the first time-stamped packet via the path 0. After time $T_5$, the slave clock device 108 computes a clock offset corresponding to path 0 based on the first time-stamped packet and the calculated delay on path 0 ($\Delta_0$). In an embodiment, the clock offset corresponding to path 0 ($Offset_0$) is calculated according to:

$$Offset_0 = T_4 - T_5 + \Delta_0. \quad \text{(Equation 3)}$$

At time $T_6$, the master clock device 104 transmits a second time-stamped packet to the slave clock device 108 via the path 1. In an embodiment, the second time-stamped packet includes a time stamp equal to (or substantially equal to) a value corresponding to time $T_6$. At time $T_7$, the slave clock device 108 receives the second time-stamped packet via the path 1. After time $T_7$, the slave clock device 108 computes a clock offset corresponding to path 1 based on the second time-stamped packet and the calculated delay on path 1 ($\Delta_1$). In an embodiment, the clock offset corresponding to path 1 ($Offset_1$) is calculated according to:

$$Offset_1 = T_6 - T_7 + \Delta_1. \quad \text{(Equation 4)}$$

The slave clock is then updated using the clock offset corresponding to path 0 and the clock offset corresponding to path 1. For example, the slave clock is then updated using the clock offset corresponding to path 0 and the clock offset corresponding to path 1 according to techniques such as described above (e.g., computing an average of the path 0 offset and the path 1 offset, selecting one of the path 0 offset and the path 1 offset based on path delay variability, etc.).

As discussed above, various packets are transmitted between the master clock device 104 and the slave clock device 108 via different paths through the network 112. The master clock device 104 and slave clock device 108 each should be able to determine the path via which packets are to travel after transmission, and to identify the path via which packets are received. Various techniques for configuring, identifying, specifying, utilizing, etc., different paths through the network 112 will now be described.

At least some of the techniques for specifying and/or utilizing different paths involve assigning different addresses (e.g., IP addresses) to the master clock and/or assigning different addresses (e.g., IP addresses) to the slave clock, wherein different addresses and/or different pairs of addresses correspond to different paths through the network 112.

In locally administered networks 112, switches/routers can be configured to utilize different paths when transmitting packets destined for the same endpoint device but including different address information (e.g., source addresses and/or destination addresses), in an embodiment. For example, the routing/forwarding tables across the network can be configured with multiple traffic engineered paths between the master clock and the slave clock. By configuring the routers/switches in such networks diverse paths are created for transmission of packets between the master clock and the slave clock.

On the other hand, in other types of networks, such as public and provider networks, it not possible or practical to configure switches/routers to provide different paths. In some networks 112, at least some switches/routers in the network 112 apply load balancing techniques in which packets destined for the same endpoint device are directed along different paths, in some embodiments. To utilize load balancing capabilities of such switches/routers when transmitting a packet to the slave clock device 108, the master clock device 104, for example, uses different addresses (e.g., destination address) and/or pairs of addresses (e.g., {master, slave}) in the packet.

In some embodiments and/or scenarios, although a plurality of addresses and/or address pairs as a whole correspond to a plurality of different paths, two or more of such addresses or address pairs may correspond to exactly the same network path, making them such addresses/address pairs redundant. Thus, in some embodiments, the master clock device 104 and/or the slave clock device 108 are configured to utilize Traceroute-based path discovery to determine addresses/address pairs that correspond to redundant paths, and then omit and/or filter addresses/address pairs to avoid using redundant paths. "Paris traceroute" (available at www.paris-traceroute.net) and "TraceFlow" (Viswanathan et al., "TraceFlow draft-zinjuvadia-traceflow-02.txt," Internet Draft, Internet Engineering Task Force (IETF), August 2008, available at tools.ietf.org/html/draft-zinjuvadia-traceflow-02) are examples of tools that discover the paths between two points in the network. Traceroute-based filtering is implemented by both the master clock device 104 and the slave clock device 108, in an embodiment. Traceroute-based filtering is implemented only on the slave clock device 108 to reduce overhead on the master clock device 104, in another embodiment. Other suitable tools for discovering the paths between two points in a network are utilized in other embodiments.

In an embodiment, the slave clock utilizes multiple IP addresses. In an embodiment, each of at least some of the multiple IP addresses of the slave clock corresponds to a different path. In an embodiment, the master clock utilizes multiple IP addresses. In an embodiment, at least some different {master IP, slave IP} address pairs corresponds to different paths. In other embodiments, the master clock utilizes multiple VLAN IDs, where each VLAN ID corresponds to a different path.

In some embodiments, other suitable fields in the packet header are utilized alternatively or additionally to determine different paths. Examples of other header fields utilized to determine a path include one or more of a user datagram protocol (UDP) port field, a Transmission Control Protocol (TCP) port field, the Flow Label field in an IPv6 header, a VLAN ID field in an Ethernet header, a Label field in a Multiprotocol Label Switching (MPLS) header, etc. In various embodiments, any combination of any subset of master IP address, slave IP address, a UDP port field, a TCP port field, the Flow Label field in an IPv6 header, a VLAN ID field in an Ethernet header, a Label field in an MPLS header, are utilized to determine and/or identify a path via which a packet is to be or was transmitted.

In some embodiments, the slave clock device 108 utilizes other suitable information to determine via which path a packet was transmitted. For example, in an embodiment, the slave clock device 108 is configured to note the physical port 154 via which a packet is received, and to determine via which path the packet was transmitted based on at least the physical port 154 via which the packet was received.

Figure 4:
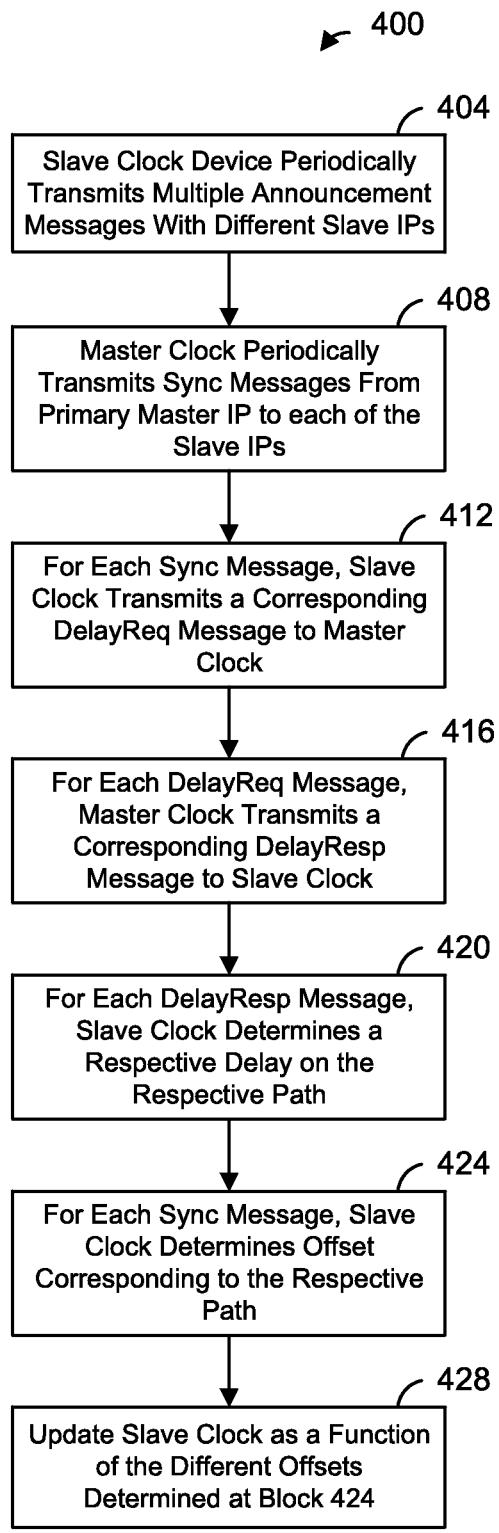
FIG. 4 is a flow diagram of an example method for maintaining a slave clock using multiple clock signals received from a master clock via multiple paths in a network, according to an embodiment.

FIG. 4 is a flow diagram of an example method 400 for maintaining a slave clock using multiple clock signals received from a master clock via multiple paths in a network, according to an embodiment. The system 100 of FIG. 1A and/or the system 180 of FIG. 1B is configured to implement the method 400, in an embodiment, and the method 400 is discussed with reference to FIGS. 1A and 1B for explanatory purposes. In other embodiments, however, the method 400 is implemented by another suitable system.

FIG. 4 is described, for explanatory purposes, with reference to messages similar to messages utilized in the precision time protocol (PTP). In other embodiments, messages similar to messages utilized in the network time protocol (NTP) are utilized.

Multiple IP addresses (slave IP addresses) are associated with the slave clock, and one of the slave IP addresses is designated as a primary slave IP address, in an embodiment. Similarly, at least one IP address (master IP address) is associated with the master clock. One of the at least one master IP addresses is designated as a primary master IP address, in an embodiment. If there is only one master IP address, the single master IP address is designated as the primary slave IP address, in an embodiment.

At block 404, the slave clock device 108 periodically transmits multiple announcement messages, each announcement message in the multiple announcement messages having a different slave IP address, in an embodiment. The multiple announcement messages are received by the master clock device 104, and the master clock device 104 notes the different slave IP addresses included in the multiple announcement messages.

At block 408, after the master clock device 104 periodically transmits multiple synchronization messages to the slave clock device 108, each synchronization message in the multiple synchronization messages having one of the multiple slave IP addresses from the multiple announcement messages of block 404, in an embodiment. Each synchronization message is transmitted via a different path, and each slave IP address corresponds to a corresponding one of the different paths, in an embodiment. Each synchronization message includes the primary master IP address, in an embodiment. Each synchronization message includes a timestamp corresponding to a value of the master clock when the synchronization message was transmitted by the master clock device 104, in an embodiment.

At block 412, the slave clock device 108 transmits to the master clock device 104 a delay request message responsive to each synchronization message. Each delay request message includes one of the multiple slave IP addresses.

At block 416, the master clock device 104 transmits to the slave clock device 108 a delay response message responsive to each delay response message from the slave clock device 108. Each delay response message includes one of the multiple slave IP addresses, and each delay response message is transmitted via a different path, in an embodiment. Each delay response message includes the primary master IP address, in an embodiment.

At block 420, the slave clock device 108 receives the multiple delay response messages transmitted by the master clock device 104 at block 416. For each delay response message received at block 420, the slave clock device 108 determines a delay corresponding to the path via which the delay response message was received. In an embodiment, the slave clock device 108 determines the delay based on (i) when the delay response message was received at the slave clock device 108, and (ii) when the corresponding delay request message (block 412) was transmitted by the slave clock device 108. For each delay response message received at block 420, the slave clock device 108 determines the path via which the message was received based on the slave IP address in the message, in an embodiment.

At block 424, the slave clock device 108 receives multiple synchronization messages periodically transmitted by the master clock device 104 at block 408. For each synchronization message received by the slave clock device 108, the slave clock device 108 determines a clock offset corresponding to the path via which the synchronization message was received. In an embodiment, the slave clock device 108 determines the clock offset based on (i) a value of the slave clock when the synchronization message was received at the slave clock device 108, (ii) the master clock time stamp in the synchronization message, and (iii) the delay for the corresponding path (block 420). For each synchronization message received by the slave clock device 108, the slave clock device 108 determines the path via which the message was received based on the slave IP address in the message, in an embodiment.

At block 428, the slave clock device 108 updates the slave clock as a function of the different offsets, determined at block 424, corresponding to the different paths, in an embodiment.

In some embodiments, multiple master IP addresses are associated with the master clock, where one of the at least one master IP addresses is designated as a primary master IP address, in an embodiment. In some embodiments, respective synchronization messages for each {master IP, slave IP} address pair are periodically transmitted by the master clock device 104 at block 408, and the different {master IP, slave IP} address pairs correspond to different paths. In some embodiments, the slave clock device 108 transmits, at block 412, a corresponding delay request message to the master IP address included in the delay request message. In some embodiments, for each delay response message received at block 420, the slave clock device 108 determines the path via which the message was received based on the {master IP, slave IP} address pair in the message. In some embodiments, for each synchronization message received by the slave clock device 108, the slave clock device 108 determines the path via which the message was received based on the {master IP, slave IP} address pair in the message.

Figure 5:
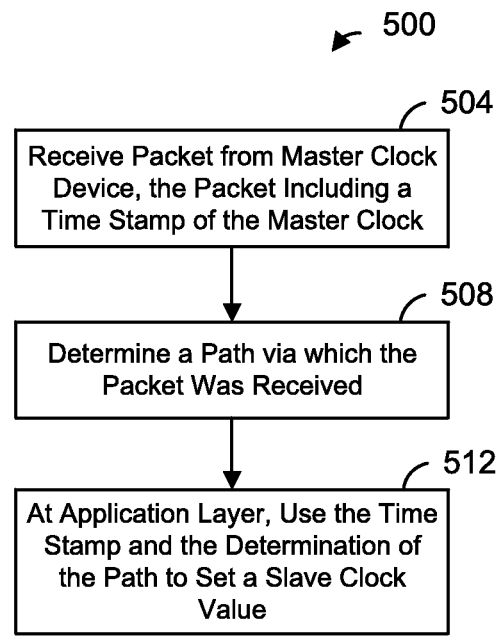
FIG. 5 is a flow diagram of an example method for maintaining a slave clock using a packet received from a master clock, according to an embodiment.

FIG. 5 is a flow diagram of an example method 500 for setting a slave clock, according to an embodiment. The slave clock device 108 of FIG. 1A and/or FIG. 1B is configured to implement the method 500, in an embodiment, and the method 500 is discussed with reference to FIGS. 1A and 1B for explanatory purposes. In other embodiments, however, the method 500 is implemented by another suitable device.

At block 504, a packet is received at the slave clock device 108, the packet having been transmitted by the master clock device 104. The packet includes a time stamp corresponding to the master clock. In an embodiment, the time stamp corresponds to a value of the master clock when the packet was transmitted by the master clock.

At block 508, the slave clock device 108 determines via which one of multiple paths the packet was received at block 504. In an embodiment, the slave clock device 108 determines via which one of the multiple paths based on an address in the packet. In an embodiment, the slave clock device 108 determines via which one of the multiple paths based on a slave IP address in the packet. In an embodiment, the slave clock device 108 determines via which one of the multiple paths based on a pair of addresses in the packet. In an embodiment, the slave clock device 108 determines via which one of the multiple paths based on a {master IP, slave IP} address pair in the packet.

In an embodiment, the clock synchronization module 150 of the slave clock device 108 is configured to determine via which one of multiple paths the packet was received at block 504. In an embodiment, some other module of the slave clock device 108 is configured to determine via which one of multiple paths the packet was received at block 504. In some embodiments, the module implementing block 508 operates at the application layer in the multi-layer communication protocol stack (e.g., the TCP/IP protocol stack), and/or operates at another suitable layer at least at a fourth layer in a multi-layer communication protocol stack (e.g., corresponding to the OSI model). In an embodiment, the module implementing block 508 is an application layer module and/or operates at a fourth layer or above in a multi-layer communication protocol stack, and also determines via which one of multiple network paths the packet was received at block 504. In other embodiment, the module implementing block 508 operates at a layer below the application layer and/or below the fourth layer in the multi-layer protocol stack. For example, in some embodiments, the module implementing block 508 operates at the IP layer or at Layer-3 in a multi-layer protocol stack. As another example, in some embodiments, the module implementing block 508 operates at the MAC layer or at Layer-2 in a multi-layer protocol stack.

At block 512, the slave clock device 108 uses the path information determined at block 508 and the time stamp in the packet received at block 504 to set the slave clock value. In an embodiment, block 512 is performed at the application layer in a multi-layer communication protocol stack, and/or operates at another suitable layer at least at the fourth layer in the multi-layer communication protocol stack, and also utilizes network path information to set the slave clock value. In an embodiment, block 512 is implemented by the clock synchronization module and/or the clock module 160. In other embodiments, the module implementing block 512 operates at a layer below the application layer and/or below the fourth layer in the multi-layer protocol stack. For example, in some embodiments, the module implementing block 512 operates at the IP layer or at Layer-3 in a multi-layer protocol stack. As another example, in some embodiments, the module implementing block 512 operates at the MAC layer or at Layer-2 in a multi-layer protocol stack.

In some embodiments, setting the slave clock value at block 512 is implemented according to the various techniques discussed above with respect to FIGS. 1A, 1B, 2A, 2B, and 3. For example, different clock results corresponding to the plurality of different communication paths through the network 112 are determined and utilized to set the slave clock as discussed above, in some embodiments.

Figure 6:
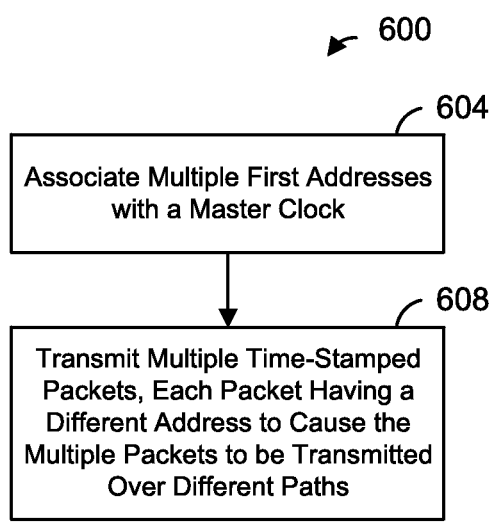
FIG. 6 is a flow diagram of an example method for facilitating determining clock values across a network, according to an embodiment.

FIG. 6 is a flow diagram of an example method 600 for facilitating determining clock values across a network, according to an embodiment. The master clock device 104 of FIGS. 1A and/or 1B is configured to implement the method 600, in an embodiment, and the method 600 is discussed with reference to FIGS. 1A and 1B for explanatory purposes. In other embodiments, however, the method 600 is implemented by another suitable device.

At block 604, multiple first addresses are associated with the master clock. For example, multiple IP addresses (master IP addresses) are associated with the master clock by the clock module 120, in an embodiment.

At block 608, multiple time-stamped packets are transmitted by the master clock device 104 to the slave clock device 108, where each packet includes a different one of the multiple addresses of block 604. The different master IP addresses in the multiple time-stamped packets cause, at least partially, the multiple time-stamped packets to be transmitted over different paths in the network 112. In some embodiments, the multiple packets include multiple slave IP addresses, and the different {master IP, slave IP} address pairs cause, at least partially, the multiple time-stamped packets to be transmitted over different paths in the network 112.

Figure 7:
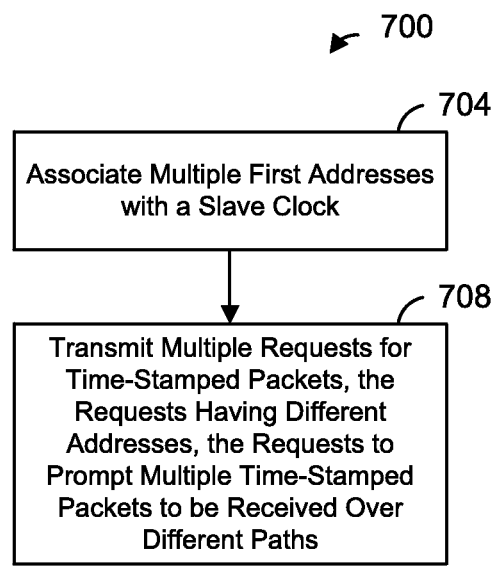
FIG. 7 is a flow diagram of another example method for facilitating determining clock values across a network, according to an embodiment.

FIG. 7 is a flow diagram of an example method 700 for facilitating determining clock values across a network, according to an embodiment. The slave clock device 108 of FIGS. 1A and/or 1B is configured to implement the method 700, in an embodiment, and the method 700 is discussed with reference to FIGS. 1A and 1B for explanatory purposes. In other embodiments, however, the method 700 is implemented by another suitable device.

At block 704, multiple first addresses are associated with the slave clock. For example, multiple IP addresses (slave IP addresses) are associated with the slave clock by the clock module 160, in an embodiment.

At block 708, multiple requests are transmitted to the master clock device 104, the multiple requests including the multiple addresses to cause the master clock device 104 to transmit multiple time-stamped packets via different paths in the network 112, so that the multiple time-stamped packets are received by the slave clock device 108 via different paths in the network 112. The different slave IP addresses in the requests cause, at least partially, the multiple time-stamped packets to be received over different paths in the network 112. In some embodiments, the multiple packets include multiple master IP addresses, and the different {master IP, slave IP} address pairs cause, at least partially, the multiple time-stamped packets to be received over different paths in the network 112.

In an embodiment, an algorithm similar to the Best Master Clock Algorithm (BMCA) is utilized. For example, the slave clock device is configured to run BMCA to find the best instances of the same master clock, the different instances corresponding to different paths. The slave clock then utilizes the selected instances of the master using techniques such as described above.

Techniques, devices, and systems such as described above are utilized, in some embodiments, to handle security threats such as a delay attack, in which a malicious man-in-the-middle adversary selectively adds delay to clock synchronization time-stamped packets sent between a master clock and a slave clock. For example, in some embodiments, the master clock transmits multiple time-stamped protocol packets via multiple different paths, and an adversary maliciously delays packets over some subset of the paths. The slave clock, however, detects that measured delays associated with the subset of paths are not reliable and does not utilize protocol packets transmitted via the subset of unreliable paths to synchronize with the master clock.

Figure 8A:
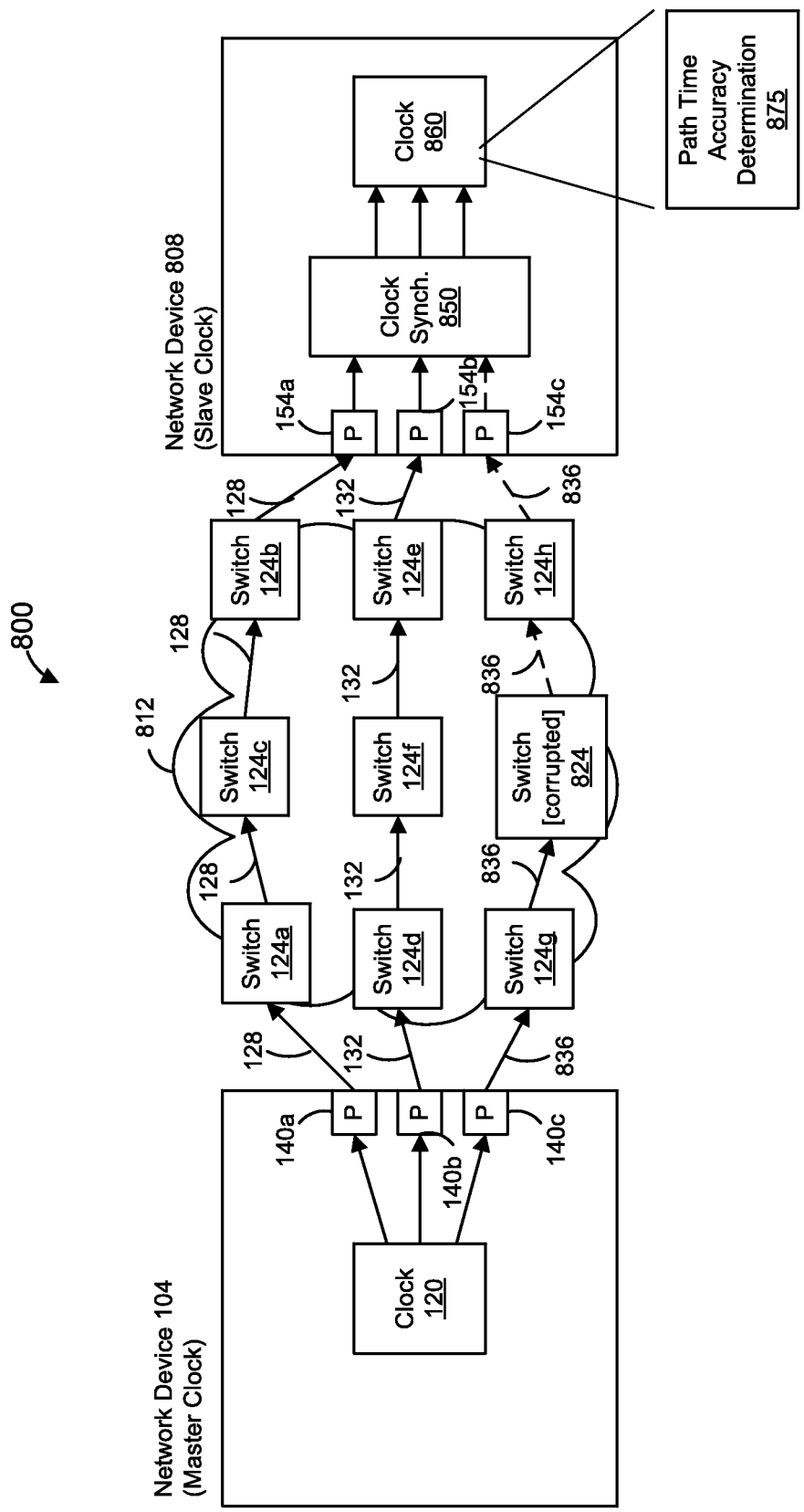
FIG. 8A is a block diagram of an example system in which a slave clock is maintained based on a master clock and based on signals transmitted by the master clock via multiple paths in a network, according to an embodiment.

FIG. 8 is a block diagram of an example system 800, according to an embodiment. The system 800 is similar to the system 100 of FIG. 1A, and like-numbered elements are not discussed in detail.

The example system 800 includes the master clock device 104 communicatively coupled to a second network device 808 via a communication network 812. The second network device 808 implements a slave clock, and the second network device 808 is sometimes referred to herein as the slave clock device 808.

The network 812 comprises the plurality of network switches and/or routers 124, in an embodiment, and the first path 128 corresponds to a link from the switch 124a to the switch 124b via the switch 124c. The second path 132 corresponds to a link from the switch 124d to the switch 124e via the switch 124f. In an embodiment, a third path 836 corresponds to a link from a switch 124g to a switch 124h via a switch 824.

According to an embodiment, one or more of the switches in the network 812 is corrupted by a malicious third party entity or component. In particular, the third party entity or component can interface with or connect to one or more of the switches in the network 812 in an attempt to attack or otherwise corrupt the one or more switches to adversely affect the clock synchronization between the master clock device 104 and the slave clock device 808. In some cases, the third party entity or component may wish to manipulate the clock synchronization by delaying the time-stamped packets through the corresponding path. As depicted in FIG. 8, the switch 824 is corrupted. For example, an entity or individual may corrupt the switch by accessing the switch 824 in an attempt to delay the transmission of the time-stamped packets and accordingly disrupt the clock synchronization. Accordingly, a time synchronization protocol packet sent through the third path 836 from the switch 124g to the switch 124h via the corrupted switch 824 can be delayed or otherwise manipulated. FIG. 8 depicts the third path 836 as including both a non-corrupted portion with a solid line (from the first network device 104 to the corrupted switch 824 via the switch 124g) and a corrupted portion with a dashed line (from the corrupted switch 824 to the slave clock device 808 via the switch 124h).

In an embodiment, the clock module 120 is configured to cause multiple time-stamped packets to be transmitted via multiple different paths. As an illustrative example, the clock module 120 causes a first time-stamped packet to be transmitted from the master clock device 104 to the slave clock device 808 via the path 128, causes a second time-stamped packet to be transmitted from the master clock device 104 to the slave clock device 808 via the path 132, and causes a third time-stamped packet to be transmitted from the master clock device 104 to the slave clock device 808 via the path 836. In an embodiment, the master clock device 104 includes multiple ports 140, and the clock module 120 is configured to cause the first time-stamped packet to be transmitted via the port 140a, the second time-stamped packet to be transmitted via the port 140b, and the third-time stamped packet to be transmitted via a port 140c. In other embodiments and/or scenarios, each of at least some of the time-stamped packets is transmitted via the same port 140. In one embodiment, the master clock device 104 includes only a single port 140, and path diversity is entirely provided by the network 812.

A clock synchronization module 850 of the slave clock device 808 is configured to determine different clock results corresponding to the plurality of time-stamped packets transmitted by the master clock device 104, and corresponding to the plurality of different communication paths through the network 812. For example, the clock synchronization module

850 is configured to determine a first clock result corresponding to the first time-stamped packet transmitted via the first path 128, a second clock result corresponding to the second time-stamped packet transmitted via the second path 132, and a third clock result corresponding to the third time-stamped packet transmitted via the third path 836. In an embodiment, the slave clock device 808 includes multiple ports 154, and the first time-stamped packet is received via the port 154*a*, the second time-stamped packet is received via the port 154*b*, and the third time-stamped packet is received via a port 154*c*. In another embodiment, the master clock device 104 may send the time-stamped packets through a single port 104, via the multiple paths 128, 132, 836, for receipt by a single port 154 of the slave clock device 808. In a further embodiment, the master clock device 104 may include a single port 140 and the slave clock device 808 may include multiple (e.g., three or other amounts) ports 140, or vice-versa.

The clock synchronization module 850 is configured to determine each clock result based on a respective time stamp in the respective time-stamped packet transmitted via the respective path. In an embodiment, each clock result generated by the clock synchronization module comprises an offset between the master clock maintained at the master clock device 104 and a slave clock maintained at the slave clock device 808. For example, the clock synchronization module 850 is configured to determine each offset based on (i) the respective time stamp in the respective time-stamped packet transmitted via the respective path, and (ii) a value of the slave clock at a respective time at which the respective time-stamped packet was received by the slave clock device 808, in an embodiment. As an illustrative example, in an embodiment, the clock synchronization module 850 determines a first offset based on (i) a first time stamp in the first time-stamped packet transmitted via the first path 128, and (ii) a first value of the slave clock at a first time at which the first time-stamped packet was received by the slave clock device 808; the clock synchronization module 850 determines a second offset based on (i) a second time stamp in the second time-stamped packet transmitted via the second path 132, and (ii) a second value of the slave clock at a second time at which the second time-stamped packet was received by the slave clock device 808; and the clock synchronization module 850 determines a third offset based on (i) a third time stamp in the third time-stamped packet transmitted via the third path 836, and (ii) a third value of the slave clock at a third time at which the third time-stamped packet was received by the slave clock device 808.

In another embodiment, each clock result generated by the clock synchronization module 850 comprises a clock value (e.g., a time-of-day value) corresponding to the master clock maintained at the master clock device 104. For example, the clock synchronization module 850 is configured to determine each clock value based on the respective time stamp in the respective time-stamped packet transmitted via the respective path, in an embodiment. As an illustrative example, in an embodiment, the clock synchronization module 850 determines a first clock value based on the first time stamp in the first time-stamped packet transmitted via the first path 128, determines a second clock value based on the second time stamp in the second time-stamped packet transmitted via the second path 132, and determines a third clock value based on the third time stamp in the third time-stamped packet transmitted via the third path 836.

As discussed herein, the clock synchronization module 850 is configured to maintain, for each path, a respective path time data set that includes a respective path-dependent clock, or information for generating the respective clock result such as a respective path delay measurement, a respective clock offset, etc., in some embodiments. In some embodiments, the clock synchronization module 850 uses the path time data sets to generate the clock results. In other embodiments, the clock results are the path time data sets or are included in the path time data sets. In some embodiments in which the clock synchronization module 850 is configured to maintain respective path-dependent clocks, the clock synchronization module 850 includes or utilizes respective counter circuits that maintain the different path-dependent clocks.

A clock module 860 in the slave clock device 808 is configured to maintain the slave clock, in some embodiments. In an embodiment, the slave clock is a time-of-day clock. In another embodiment, the slave clock is a counter not directly linked to a time-of-day. In an embodiment, the clock module 860 includes or utilizes a counter circuit that maintains the slave clock. In an embodiment, the clock module 860 is an application layer module operating at the application layer in the multi-layer communication protocol stack. In other embodiments, the clock module 160 operates at another suitable layer at least at a fourth layer in a multi-layer communication protocol stack. In some embodiments in which the clock synchronization module 850 is configured to maintain respective path-dependent clocks, the clock module 860 is configured to select one of the path-dependent clocks as the slave clock rather than maintaining a separate slave clock. For example, the clock module 860 is configured to select one of the path-dependent clocks as the slave clock based on a measure of path delay variability, in some embodiments. For instance, the clock module 860 is configured to select one of the path-dependent clocks having a lowest measure of path delay variability from amongst a set of clocks corresponding to different network paths. In operation, if a network path is subject to a delay attack, the network path may have a time-of-day calculation that is significantly different from those of the other network paths. By not incorporating a time-of-day value for a certain network path that significantly deviates from those of other network paths, the clock module 860 may thus determine the time-of-day based on the "valid" network paths. Accordingly, in order to make a malicious delay successful, an attacker would need to similarly corrupt one or more additional network paths, which would prove much more difficult than only corrupting a single network path.

The clock module 860 is configured to determine the slave clock value using one or more of the plurality of clock results generated by the clock synchronization module 850, in some embodiments. As will be described in more detail below, the clock module 860 is configured to exclude clock results determined to be unreliable when determining the slave clock value, in an embodiment. At least in some scenarios, clock results that are corrupted due to a delay attack are identified as unreliable and are not used by the clock module 860 to determine the slave clock value, in some embodiments.

In an embodiment, the clock module 860 is configured to determine the slave clock value at least by mathematically combining at least some of the plurality of clock results (e.g., those clock results corresponding to "valid" paths) generated by the clock synchronization module 850. In another embodiment, the clock module 860 is configured to determine the slave clock value at least by selecting one of the plurality of clock results generated by the clock synchronization module 850. In an embodiment, the clock module 860 is configured to determine the slave clock value at least by (i) selecting a subset of the plurality of clock results generated by the clock synchronization module 850 by excluding clock results determined to be unreliable, and (ii) selecting one of the clock results in the subset. In some embodiments, determining that one or more clock results are unreliable comprises determining accuracy metrics for the clock results and analyzing the accuracy metrics to determine whether one or more of the clock results are unreliable. In some embodiments, the accuracy metrics may indicate whether one or more of the clock results have been maliciously affected by a delay attack, and thus clock results that have been maliciously affected by a delay attack can then be omitted from the subset of clock results utilized to determine the slave clock value. In this manner, calculation of the slave clock value is not adversely affected by unreliable clock results corresponding to paths subject to the delay attack, in some embodiments.

In another embodiment, the clock module 860 is configured to determine the slave clock value at least by (i) combining at least some of the plurality of clock results generated by the clock synchronization module 850 in some situations, and (ii) selecting one of the plurality of clock results generated by the clock synchronization module 850 in other situations. In another embodiment, the clock module 860 is configured to determine the slave clock value at least by (i) selecting a subset of the plurality of clock results generated by the clock synchronization module 850 by excluding clock results determined to be unreliable, and (ii) combining the subset of clock results.

In an embodiment, the clock module 860 computes a respective clock value (e.g., a respective time of day clock ($TOD_i$)) for each of the plurality of paths (e.g., paths 128, 132, 836) via respective clock signals received from the master clock device 104. In some embodiments, the clock module 860 is further configured to (i) generate accuracy metrics for the clock values corresponding to the plurality of paths, and (ii) utilize the accuracy metrics to determine whether one or more of the clock values is unreliable based on the accuracy metrics. For example, in an embodiment, the clock module 860 is configured to, for each path (the path being analyzed) in the plurality of paths, mathematically combine clock values from one or more of the remaining paths in the plurality of paths, and then use the mathematical combination of the clock values from the remaining paths to determine an accuracy metric for the clock value of the path being analyzed. For example, for the path 128, the clock module 860 mathematically combines (e.g., computes an average of) the clock values from the other paths 132, 836, and then generates an accuracy metric for the path 128 by comparing the clock value for the path 128 with the mathematical combination (e.g., average) of the clock values of the other paths 132, 836; for the path 132, the clock module 860 mathematically combines (e.g., computes an average of) the clock values from the other paths 128, 836, and then generates an accuracy metric for the path 132 by comparing the clock value for the path 132 with the mathematical combination (e.g., average) of the clock values of the other paths 128, 836; and for the path 836, the clock module 860 mathematically combines (e.g., computes an average of) the clock values from the other paths 128, 132, and then generates an accuracy metric for the path 836 by comparing the clock value for the path 836 with the mathematical combination (e.g., average) of the clock values of the other paths 128, 132.

In an embodiment, the clock module 860 includes a path time accuracy determination module 875 configured to identify which clock values, if any, for the respective paths are inaccurate (e.g., unreliable). In an embodiment, the path time accuracy determination module 875 is configured to, for each path (the path being analyzed) in the plurality of paths, mathematically combine clock values from one or more of the remaining paths in the plurality of paths, and then use the mathematical combination of the clock values from the remaining paths to determine an accuracy metric for the clock value of the path being analyzed. For example, in an embodiment, the path time accuracy determination module 875 is configured to, for each path (the path being analyzed) in the plurality of paths, generate an accuracy metric at least by: (i) generating an average of one or more of the remaining paths in the plurality of paths, and (ii) generating the accuracy metric based on a comparison of the clock value of the path being analyzed with the average of the one or more of the remaining paths. For example, the path time accuracy determination module 875 calculates a difference between a clock value for the path being analyzed with an average clock value of the remaining paths, in an embodiment. The difference is then compared to a threshold to determine whether the clock value for the path being analyzed is reliable, in an embodiment. For example, if the difference meets the threshold (e.g., is greater than the threshold, is greater than or equal to the threshold, etc.), the clock value for the path is determined to be unreliable, in an embodiment. For example, when the clock value for the path being analyzed is significantly different from the average of the clock values of the remaining paths (e.g., the difference meets the threshold), this may indicate that the path being analyzed was subject to a delay attack, in an embodiment.

In some embodiments, the path time accuracy determination module 875 can determine which one or more of the clock values are inaccurate or differ from the other clock values by a specified degree based on the calculations. In particular, the path time accuracy determination module 875 can create, modify, or otherwise maintain a group of clock values that includes clock values deemed to be accurate. Accordingly, the path time accuracy determination module 875 can include in the group clock values that are deemed to be accurate and can omit from the group clock values that are deemed to be inaccurate. In some embodiments, the path time accuracy determination module 875 can determine the group clock value selections by comparing the calculated difference between a given clock value and other clock values to a predetermined threshold. It is noted that the embodiments envision any suitable amount for the predetermined threshold. For example, the predetermined threshold can be 5 ms, 50 ms, 100 ms, or any other suitable amount lesser or greater than these amounts. Further, the predetermined threshold can be automatically set or programmed, or a user or administrator can set the predetermined threshold to be any amount. In some embodiments, the threshold is adaptable and/or varies over time based on, for example, measured network conditions such as path delay variability.

In some embodiments, if the path time accuracy determination module 875 determines that the absolute value of a calculated difference for a given clock value (i.e., the difference between a clock value for a given path with an average clock value of the other paths) meets the threshold, the path time accuracy determination module 875 omits that clock value from the group of reliable clock values. In contrast, if the path time accuracy determination module 875 determines that the absolute value of a calculated difference for a given clock value does not meet the predetermined threshold, the path time accuracy determination module 875 includes that clock value to in group of reliable clock values. For example, assume that the clock value for the path 128 is 12:15:05.000, the clock value for the path 132 is 12:15:05.002 (i.e., 2 milliseconds after the clock value for the path 128), and the clock value for the path 836 is 12:15:05.025 (i.e., 25 milliseconds after the clock value for the path 128), and the threshold is 20 ms. Accordingly, the difference between the clock value for the path 836 (12:15:05.025) and the average clock value for the other paths 128, 132 (12:15:05.001) is 24 ms, which exceeds the threshold by 4 ms; the difference between the clock value for the path 128 (12:15:05.000) and the average clock value for the other paths 132, 836 (12:15:05.0135) is 13.5 ms, which does not meet the threshold; and the difference between the clock value for the path 132 (12:15:05.002) and the average clock value for the other paths 128, 836 (12:15:05.0125) is 10.5 ms, which also does not meet the threshold. Therefore, the path time accuracy determination module 875 omits the clock value for the path 836 (12:15:05.025) from the group of reliable clock values, and includes the clock value for the path 128 (12:15:05.000) and the clock value for the path 132 (12:15:05.002) to the group of reliable clock values.

According to some embodiments, the clock module 860 can be configured to set the slave clock value based on the clock values in the group of accurate clock values as determined by the path time accuracy determination module 875. In particular, the clock module 860 can determine the slave clock value as an average of clock values in the group of accurate clock values. For example, if the group of accurate clock values includes the clock value for the path 128 (12:15:05.000) and the clock value for the path 132 (12:15:05.002), the clock module 860 can calculate the average clock value as 12:15:05.001, and can accordingly set the slave clock value as 12:15:05.001.

In some embodiments, the clock module 860 is configured to select one of the clock values in the group of accurate clock values as the slave clock value. For example, the clock module 860 is configured to select one of the clock values in the group of accurate clock values as a clock value corresponding to network path with a lowest measure of path delay variability from amongst the network paths corresponding to the group of accurate clock values. In some embodiments, the clock module 860 is configured to (i) determine the slave clock value as an average of an average of clock values in the group of accurate clock values in some circumstances, and (ii) select one of the clock values in the group of accurate clock values as the slave clock value in other circumstances using techniques similar to those discussed above with respect to FIGS. 2A and 2B.

Figure 8B:
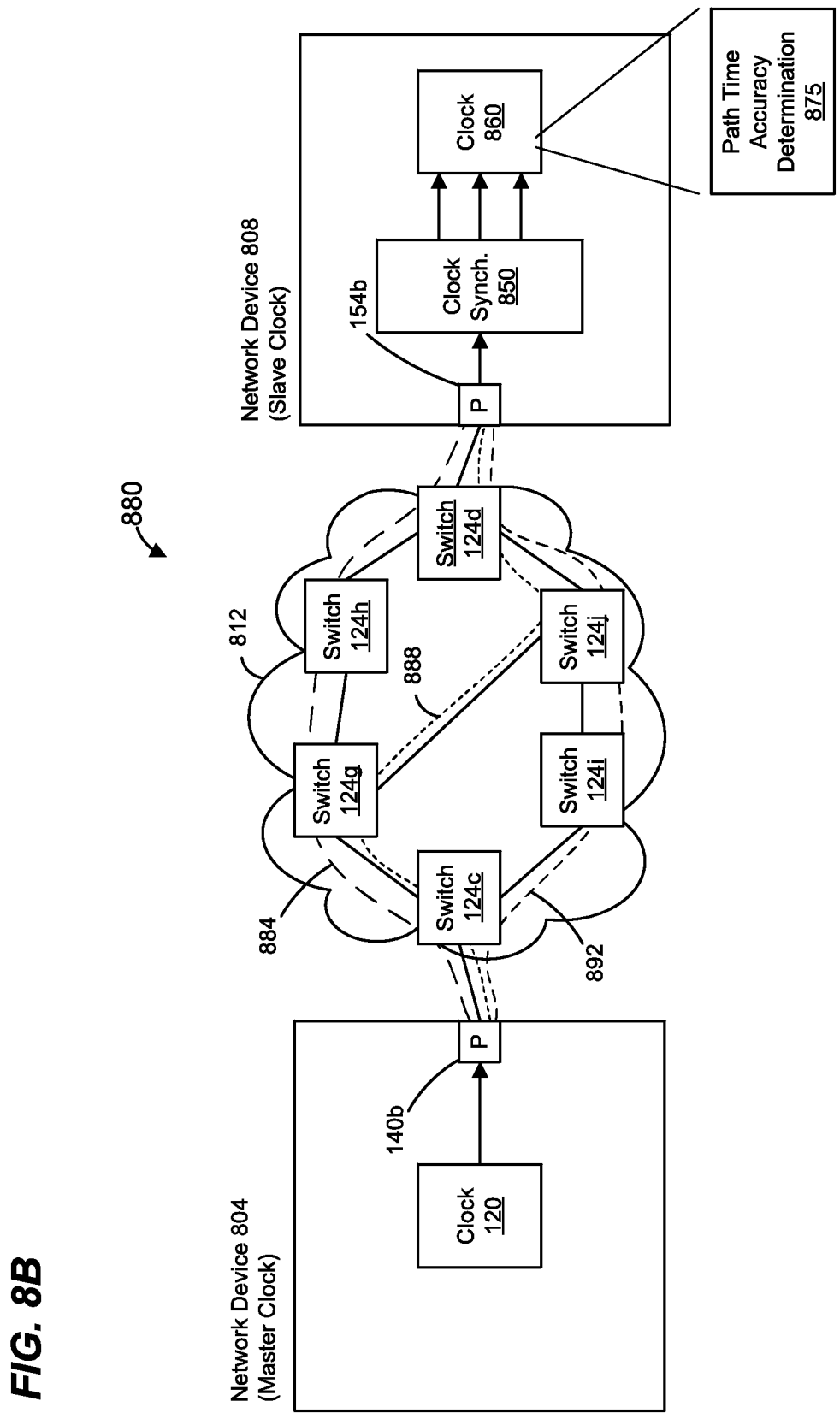
FIG. 8B is a block diagram of another example system in which a slave clock is maintained based on a master clock and based on signals transmitted by the master clock via multiple paths in a network, according to an embodiment.

FIG. 8B is a block diagram of another example system 880 which the master clock device 104 includes only a single port 140b and the slave clock device 808 includes only a single port 154b. Path diversity is entirely provided by the network 812. As discussed above, for example, switches 124 are configured to utilize different paths 884, 888, 892 when transmitting packets destined for the same endpoint device but including different header information (e.g., source addresses, destination addresses, Layer 4 ports, etc.), in some embodiments. As another example, switches 124 apply load balancing techniques in which packets destined for the same endpoint device are directed along different paths 884, 888, 892 based upon different header information in the packets (e.g., source addresses, destination addresses, Layer 4 ports, etc.), in some embodiments. Thus, to cause the network 812 to transmit packets to the slave clock device 808 via different paths 884, 888, 892, the master clock device 104 varies header information in the packets (e.g., source addresses, destination addresses, Layer 4 ports, etc.), in some embodiments.

Figure 9:
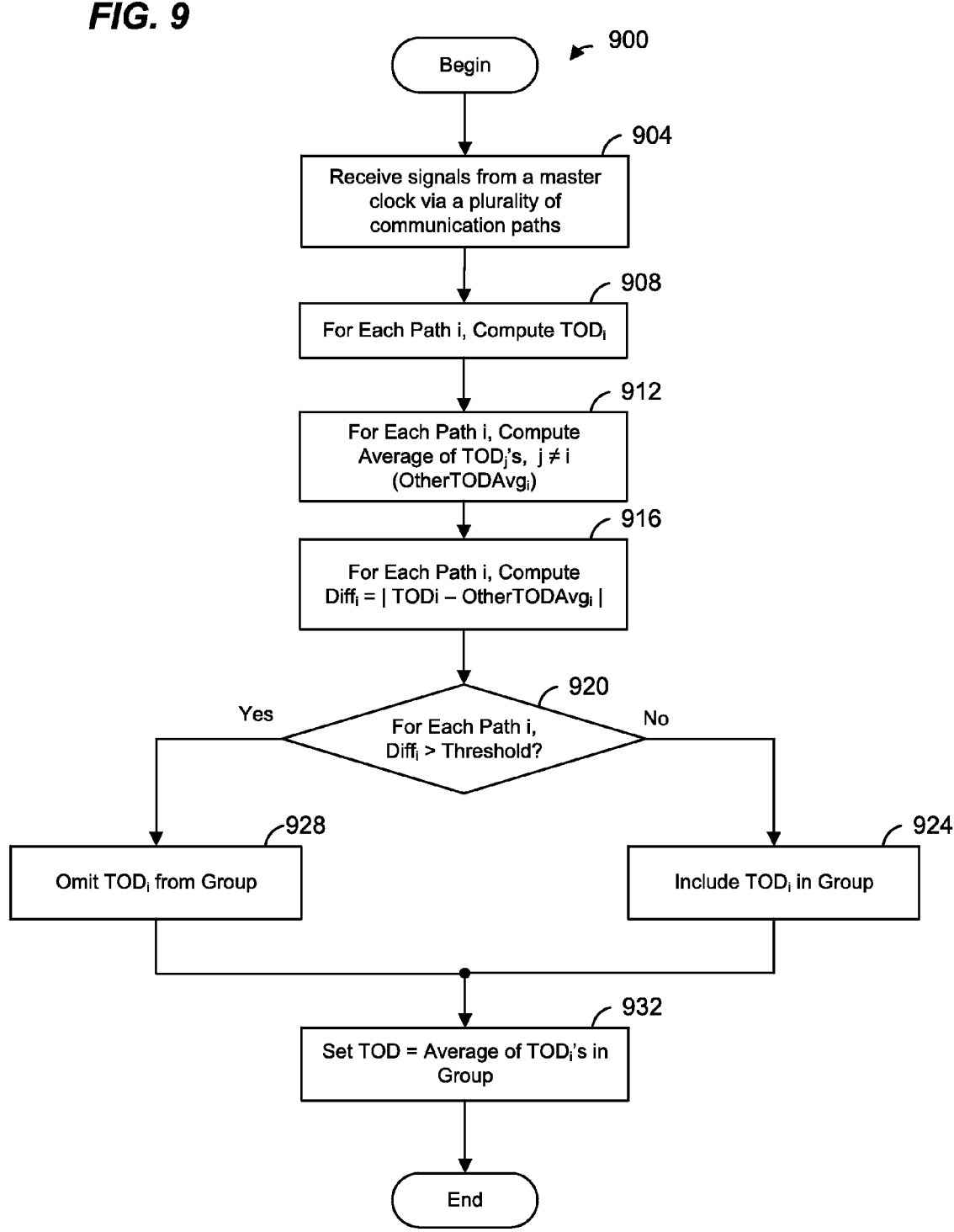
FIG. 9 is a flow diagram of another example method for facilitating determining clock values across a network, according to an embodiment.

FIG. 9 is a flow diagram of an example method 900 for calculating a time of day from multiple clock results of multiple clock paths, according to an embodiment. The slave clock device 808 of FIG. 8 is configured to implement the method 900, in an embodiment, and the method 900 is discussed with reference to FIG. 8 for explanatory purposes. In other embodiments, however, the method 900 is implemented by another suitable device.

At block 904, signals from a master clock (such as the master clock device 104 of FIG. 8) are received via a plurality of communication paths. For example, a first signal is received via the path 128, a second signal can be received via the path 132, and a third signal can be received via the path 836. The plurality of communication paths can each include one or more switches via which the signals are forwarded. In an embodiment, the received signals include respective time stamps corresponding to clock values of the master clock device 104. The slave clock device 808 can record the respective time stamps as well as the respective times at which the slave clock device 808 receives the respective signals, in an embodiment.

At block 908, a respective clock value (e.g., a respective time of day clock ($TOD_i$)) is determined for each of the plurality of paths via which clock signals were received from the master clock device 104. For example, a $TOD_1$ is determined from the clock signal from the master clock device 104 received via the path 128, a $TOD_2$ is determined from the clock signal from the master clock device 104 received via the path 132, and a $TOD_3$ is determined from the clock signal from the master clock device 104 received via the path 836. Block 908 comprises determining a respective $TOD_i$ each time a clock signal from the master clock is received via the respective path i, in an embodiment.

At block 912, an average time of day clock for each of the paths j other than the path i (Average $TOD_j$, $j \neq i$) is computed for each path i. For example, for the path 128, an average $TOD_{2,3}$ is computed for the other paths 132, 836; for the path 132, an average $TOD_{1,3}$ is computed for the other paths 128, 836; and for the path 836, an average $TOD_{1,2}$ is computed for the other paths 128, 132. In some embodiments, the Average $TOD_j$, $j \neq i$ is a weighted average. For example, in some embodiments, weights for calculating the weighted average are determined based on network conditions such as path delay variability, path length, number of intermediate nodes, and/or others.

At block 916, the absolute value of a difference between the $TOD_i$ and the Average $TOD_j$, $j \neq i$ is computed for each path i. For example, for the path 128, the absolute value of a difference between the $TOD_1$ for path 128 and the Average $TOD_{2,3}$ for the other paths 132, 836 is computed; for the path 132, the absolute value of a difference between the $TOD_2$ for path 132 and the Average $TOD_{1,3}$ for the other paths 128, 836 is computed; and for the path 836, the absolute value of a difference between the $TOD_3$ for path 836 and the Average $TOD_{1,2}$ for the other paths 128, 132 is computed.

At block 920, the absolute value of the difference between the $TOD_i$ and the Average $TOD_j$, $j \neq i$ computed in block 916 is compared to a threshold. In an embodiment, the threshold can be a predetermined or preset amount or can be set by a user or administrator. In some embodiments, the threshold amount is variable and/or adaptive based on, for example, network conditions such as path delay variability. If it is determined that the absolute value of the difference between the $TOD_i$ and the Average $TOD_j$, $j \neq i$ does not meet the threshold (e.g., is less than the threshold, less than or equal to the threshold, etc.), this indicates that the path i is reliable (e.g., not subject to a delay attack), and the flow proceeds to block 924. On the other hand, if it is determined at block 920 that the absolute value of the difference between the $TOD_i$ and the Average $TOD_j$, $j \neq i$ meets the threshold (e.g., is greater than the threshold, greater than or equal to the threshold, etc.), this indicates that the path i is not reliable (e.g., possibly subject to a delay attack), and the flow proceeds to block 928.

At block 924, the $TOD_i$ for the path i is included in a Group representing paths that are determined to be reliable. For example, if it is determined that the absolute value of the difference between the $TOD_1$ for the path 128 and the Average $TOD_{2,3}$ for the other paths 132, 836 does not meet the threshold, the $TOD_1$ for the path 128 is included in the Group. Flow then proceeds to block 932.

On the other hand, at block 928, the $TOD_i$ for the path i is omitted from the Group representing paths that are determined to be reliable. For example, if it is determined that the absolute value of the difference between the $TOD_3$ for the path 836 and the Average $TOD_{1,2}$ for the other paths 128, 132 meets the threshold, the $TOD_3$ for the path 836 is omitted from the Group. Flow then proceeds to block 932.

At block 932, the TOD (i.e., the slave clock value) is set to the Average $TOD_i$ for the paths i included in the Group. For example, if the $TOD_1$ for the path 128 and the $TOD_3$ for the path 132 are both included in the Group and the $TOD_2$ for the path 132 is omitted from the Group, the TOD (e.g., the slave clock value) can be set to the Average of only the $TOD_1$ for the path 128 and the $TOD_2$ for the path 132. In some embodiments, the average computed at block 932 is a weighted average. For example, in some embodiments, weights for calculating the weighted average are determined based on network conditions such as path delay variability.

In some embodiments, the method 900 is modified so that the slave clock value is select as one of the clock values in the group of accurate clock values. For example, the slave clock value is selected as one of the clock values in the group of accurate clock values corresponding to network path with a lowest measure of path delay variability from amongst the network paths corresponding to the group of accurate clock values.

In some embodiments, the method 900 is modified so that the slave clock value (i) is determined as an average of an average of clock values in the group of accurate clock values in some circumstances, and (ii) selected as one of the clock values in the group of accurate clock values in other circumstances using techniques similar to those discussed above with respect to FIGS. 2A and 2B.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any tangible, non-transitory computer readable memory such as a magnetic disk, an optical disk, a random access memory, a read only memory, a flash memory, etc. The software or firmware instructions may include machine readable instructions that, when executed by the processor, cause the processor to perform various acts.

When implemented in hardware, the hardware may comprise one or more of discrete components, an integrated circuit, an application-specific integrated circuit (ASIC), a programmable logic device, etc.

While various embodiments have been described with reference to specific examples, which are intended to be illustrative only and not to be limiting, changes, additions and/or deletions may be made to the disclosed embodiments without departing from the scope of the claims.

What is claimed is:

1. A network device, comprising:
   one or more ports to communicatively couple the network device to a master clock via a plurality of different communication paths;
   a clock synchronization module configured to determine a plurality of path time data sets corresponding to the plurality of different communication paths based on signals received from the master clock via the plurality of different communication paths between the network device and the master clock; and
   a clock module configured to:
   determine that at least one of the plurality of path time data sets is inaccurate based on a plurality of difference measures corresponding to the plurality of path time data sets, wherein ones of the difference measures respectively indicate an amount of variance of a path time data set relative to one or more other path time data sets, and
   determine a time of day as a function of a remainder of one or more path time data sets, in the plurality of path time data sets, not determined to be inaccurate;
   wherein the clock synchronization module and the clock module are implemented on one or more integrated circuit devices.

2. The network device of claim 1, wherein each difference measure of the plurality of difference measures indicates how much a respective path time data set in the plurality of path time data sets varies from other path time data sets in the plurality of path time data sets.

3. The network device of claim 1, wherein the clock module is configured to calculate each difference measure at least by:
   selecting at least one respective path time from a plurality of path times,
   determining an average of other path times in the plurality of path times, and
   calculating the difference measure based on a difference between the at least one respective path time and the average.

4. The network device of claim 3, wherein the clock module is configured to calculate the difference measure based on an absolute value of the difference between the at least one respective path time and the average.

5. The network device of claim 1, wherein the clock module is configured to, for each path time data set:
   compare the corresponding difference measure to a threshold, and
   determine whether to include the path time data set in a group based on the comparison of the corresponding difference measure to the threshold.

6. The network device of claim 5, wherein the group includes the remainder of the one or more path time data sets not determined to be inaccurate.

7. The network device of claim 5, wherein when the clock module determines that the corresponding difference measure does not meet the threshold, the clock module is configured to include the path time data set in the group.

8. The network device of claim 5, wherein when the clock module determines that the corresponding difference measure meets the threshold, the clock module is configured to omit the path time data set from the group.

9. The network device of claim 1, wherein the clock module is configured to determine the time of day at least by:
   calculating an average of the remainder of the one or more path time data sets not determined to be inaccurate, and setting the time of day as the average of the remainder of the one or more path time data sets not determined to be inaccurate.

10. The network device of claim 1, wherein the clock module is configured to determine the time of day based on selecting one of the one or more path time data sets not determined to be inaccurate.

11. A method in a network device, the method comprising:
receiving, at one or more ports of the network device, signals from a master clock, the signals from the master clock received via a plurality of different communication paths;
determining, at the network device, a plurality of path time data sets corresponding to the plurality of different communication paths based on the signals from the master clock received via the plurality of different communication paths;
determining, at the network device, that at least one of the plurality of path time data sets is inaccurate based on a plurality of difference measures corresponding to the plurality of path time data sets, wherein ones of the difference measures respectively indicate an amount of variance of a path time data set relative to one or more other path time data sets; and
determining, at the network device, a time of day as a function of a remainder of one or more path time data sets, in the plurality of path time data sets, not determined to be inaccurate.

12. The method of claim 11, wherein each difference measure of the plurality of difference measures indicates how much a respective path time data set in the plurality of path time data sets varies from other path time data sets in the plurality of path time data sets.

13. The method of claim 11, further comprising calculating each difference measure including:
selecting at least one respective path time from a plurality of path times;
determining an average of other path times in the plurality of path times; and
calculating the difference measure based on a difference between the at least one respective path time and the average.

14. The method of claim 13, further comprising:
calculating the difference measure based on an absolute value of the difference between the at least one respective path time and the average.

15. The method of claim 11, further comprising, for each path time data set:
comparing the corresponding difference measure to a threshold; and
determining whether to include the path time data set in a group based on the comparison of the corresponding difference measure to the threshold.

16. The method of claim 15, wherein the group includes the remainder of the one or more path time data sets not determined to be inaccurate.

17. The method of claim 15, wherein when the corresponding difference measure does not meet the threshold, further comprising:
including the path time data set in the group.

18. The method of claim 15, wherein when the corresponding difference measure meets the threshold, further comprising:
omitting the path time data set from the group.

19. The method of claim 11, wherein determining the time of day comprises:
calculating an average of the remainder of the one or more path time data sets not determined to be inaccurate; and
setting the time of day as the average of the remainder of the one or more path time data sets not determined to be inaccurate.

20. The method of claim 11, wherein determining the time of day comprises:
selecting one of the one or more path time data sets not determined to be inaccurate.

* * * * *